United States Patent
Shimono

(10) Patent No.: US 9,292,672 B2
(45) Date of Patent: Mar. 22, 2016

(54) SERVICE PROVIDING METHOD, RECORDING MEDIUM, AND INFORMATION PROCESSING APPARATUS

(71) Applicant: FUJITSU LIMITED, Kawasaki-shi, Kanagawa (JP)

(72) Inventor: Akio Shimono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 13/774,197

(22) Filed: Feb. 22, 2013

(65) Prior Publication Data

US 2013/0232546 A1 Sep. 5, 2013

(30) Foreign Application Priority Data

Mar. 2, 2012 (JP) ................................ 2012-046417

(51) Int. Cl.
G06F 9/00 (2006.01)
G06F 21/31 (2013.01)
G06F 21/41 (2013.01)

(52) U.S. Cl.
CPC ................ *G06F 21/31* (2013.01); *G06F 21/41* (2013.01)

(58) Field of Classification Search
None
See application file for complete search history.

(56) References Cited

U.S. PATENT DOCUMENTS

| | | | | |
|---|---|---|---|---|
| 6,768,988 B2* | 7/2004 | Boreham | .......... | G06F 17/30067 707/770 |
| 6,892,309 B2* | 5/2005 | Richmond | .......... | H04L 63/0218 709/223 |
| 7,328,233 B2* | 2/2008 | Salim | .................. | G06F 17/3089 707/999.009 |
| 8,032,558 B2* | 10/2011 | Carter | ................... | G06F 21/604 707/786 |
| 8,204,809 B1* | 6/2012 | Wise | ...................... | G06Q 40/00 705/35 |
| 8,682,698 B2* | 3/2014 | Cashman | ............... | G06Q 40/08 705/1.1 |
| 8,725,857 B2* | 5/2014 | Brown et al. | .................. | 709/223 |
| 8,850,598 B2* | 9/2014 | Pelley | .................. | G06Q 10/063 709/201 |
| 2003/0105742 A1* | 6/2003 | Boreham | .......... | H04L 29/12132 707/999.002 |
| 2011/0251992 A1* | 10/2011 | Bethlehem | .......... | H04L 12/2863 707/610 |
| 2012/0101952 A1* | 4/2012 | Raleigh | ................ | G06Q 30/016 705/304 |
| 2012/0110652 A1* | 5/2012 | Brown | .............. | G06F 17/30566 726/7 |

FOREIGN PATENT DOCUMENTS

JP 2009-238125 10/2009
WO WO 2006/006704 1/2006

OTHER PUBLICATIONS

Wonohoesodo, Roosdiana; Tari, Zahir. A Role based Access Control for Web Services. 2004 IEEE International Conference on Services Computing. Pub. Date: 2004. Relevant pp. 49-56. http://ieeexplore.ieee.org/stamp/stamp.jsp?tp=&arnumber=1357989.*

(Continued)

*Primary Examiner* — Jeremiah Avery
(74) *Attorney, Agent, or Firm* — Staas & Halsey LLP

(57) ABSTRACT

A service providing method executed by an information processing apparatus that provides a first service, the method includes receiving role information from a terminal apparatus in use by a user, the role information indicating that a second service provided by another information processing apparatus and a role assigned to the user in the second service; and determining a role assigned to the user in the first service according to the role information and relationship information that indicates a relationship between the local apparatus and the another information processing apparatus, in correspondence to the second service.

11 Claims, 24 Drawing Sheets

(56) References Cited

OTHER PUBLICATIONS

Srivatsa Mudhakar; Iyengar, Arun; Mikalsen, Thomas; Rouvellou, Isabelle; Yin, Jian. An Access Control System for Web Service Compositions. IEEE International Conference on Web Services. Pub. Date: 2007. Relevant pp. 1-8. http://ieeexplore.ieee.org/stamp/stamp.jsp?tp=&arnumber=4279576.*

Lee, Hyangjin; Jeun, Inkyoung; Jung, Hyuncheol. Criteria for evaluating the privacy protection level of Identity Management Services. Secureware '09. Third International Conference on Emerging Security Information, Systems and Technologies, 2009. Relevant pp. 155-160. http://ieeexplore.ieee.org/stamp/stamp.jsp?tp=&arnumber=5211014.*

Zou, Deqing; Yang, Laurence T.; Qiang, Weizhong; Chen, Xueguang; Han, Zongfen. An Authentication and Access Control Framework for Group Communication Systems in Grid Environment. 21st International Conference on Advanced Information Networking and Applications, 2007. http://ieeexplore.ieee.org/stamp/stamp.jsp?tp=&arnumber=4220940.*

\* cited by examiner

FIG. 1
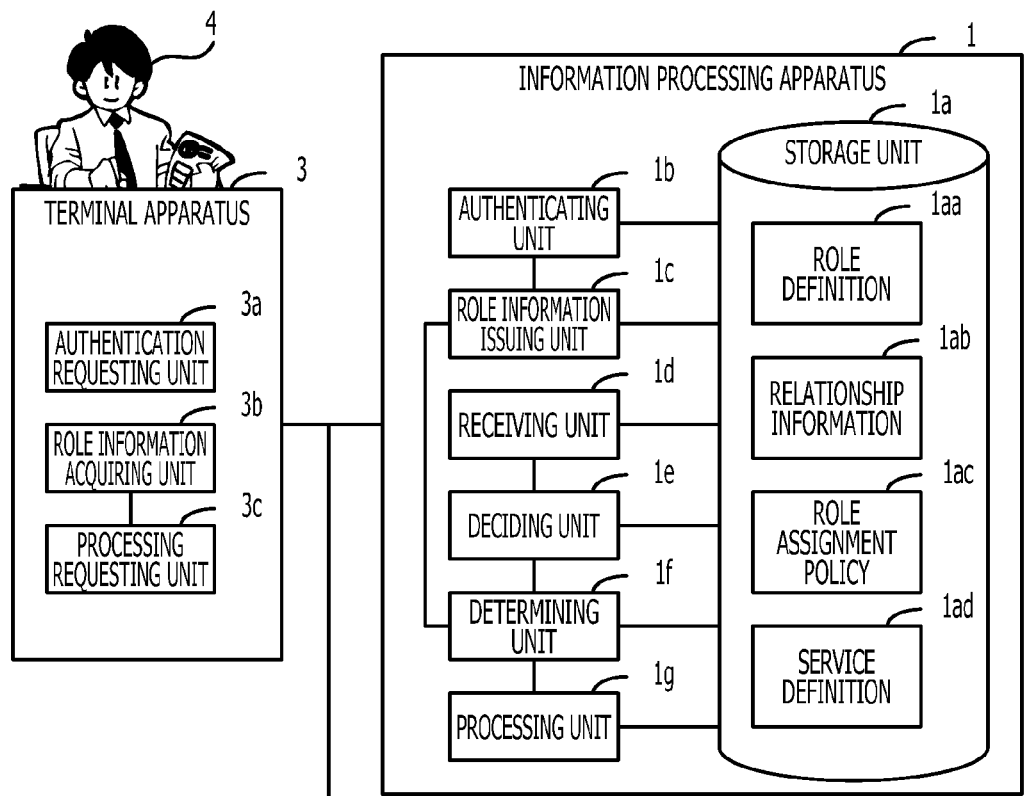
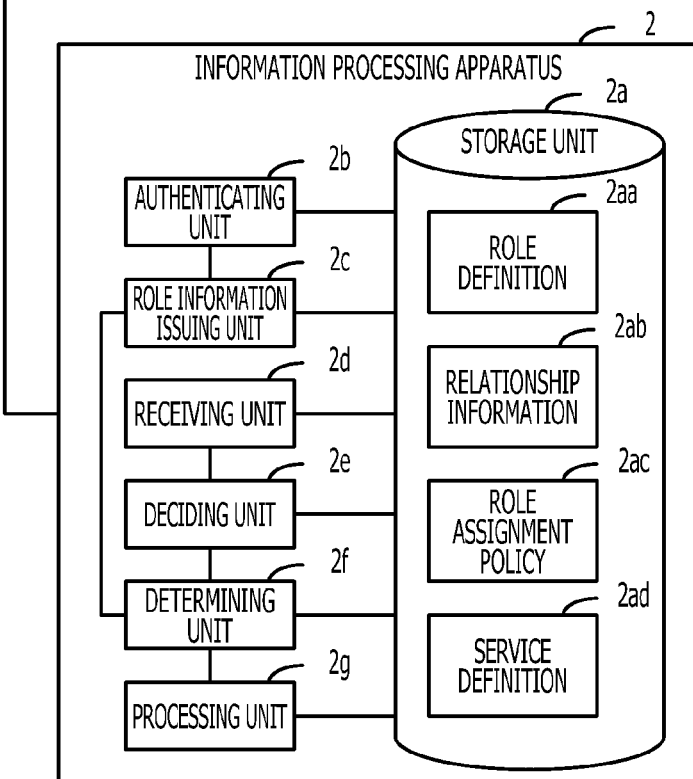

| ROLE | SERVICE |
|---|---|
| MANAGER | SERVICE A-1 |
| EMPLOYEE | SERVICE A-2 |
| BUDGET CLERK | SERVICE A-3 |
| MANAGER AT BUSINESS CONTACT | SERVICE A-4 |
| EMPLOYEE AT SUBSIDIARY | SERVICE A-5 |
| EMPLOYEE AT SUB-SUBSIDIARY | SERVICE A-6 |
| EMPLOYEE A SUBSIDIARY OF BUSINESS CONTACT | SERVICE A-7 |
| ... | ... |

SERVICE PROVIDING METHOD, RECORDING MEDIUM, AND INFORMATION PROCESSING APPARATUS

CROSS-REFERENCE TO RELATED APPLICATION(S)

This application is based upon and claims the benefit of priority of the prior Japanese Patent Application No. 2012-046417, filed on Mar. 2, 2012, the entire contents of which are incorporated herein by reference.

FIELD

The embodiments discussed herein are related to a method of providing a service according to the role of a user, to a recording medium, and to an information processing apparatus.

BACKGROUND

An information communication technology provides advanced services by linking a plurality of services on a network. In an example of this type of information communication technology, a web application program interface (API) disclosed by a service provider in the representational state transfer (REST) format is used to enable applications to be mutually linked. Access to the disclosed web API is appropriately controlled by using an authentication protocol such as, for example, OAuth. Application developers use this web API or another API provided by another service provider to develop application software. The developed application software is referred to as a mashup application.

Another information communication technology is a roll based access control technology. In the roll based access control, a role is given to an authenticated user and access to a resource is controlled by giving permission according to the role.

A technology is also considered that enables the single sign-on function used to access a plurality of networks present in a plurality of domains. This technology is thought to be able to be expanded so that it is used in both a linked domain environment and a non-linked domain environment.

An authentication system is also considered that easily sets attributes related to users in a safe manner. If an authentication token in this authentication system decides that authentication has succeeded, the authentication token sends attribute information associated with stored biological information to the unit in use. The unit in use receives the attribute information, and an attribute identifying unit in the unit in use identifies the user's attribute indicated by the received attribute information, after which a service corresponding to the user's attribute identified by the attribute identifying unit is provided.

Examples disclosed as related art include, for example, International Publication Pamphlet No. WO 2006/006704 and Japanese Laid-open Patent Publication No. 2009-238125.

SUMMARY

According to an aspect of the invention, a service providing method executed by an information processing apparatus that provides a first service, the method comprising: receiving role information from a terminal apparatus in use by a user, the role information indicating that a second service provided by another information processing apparatus and a role assigned to the user in the second service; and determining a role assigned to the user in the first service according to the role information and relationship information that indicates a relationship between the local apparatus and the another information processing apparatus, in correspondence to the second service.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an example of the structure of a system in a first embodiment;

DESCRIPTION OF EMBODIMENTS

Figure 2:
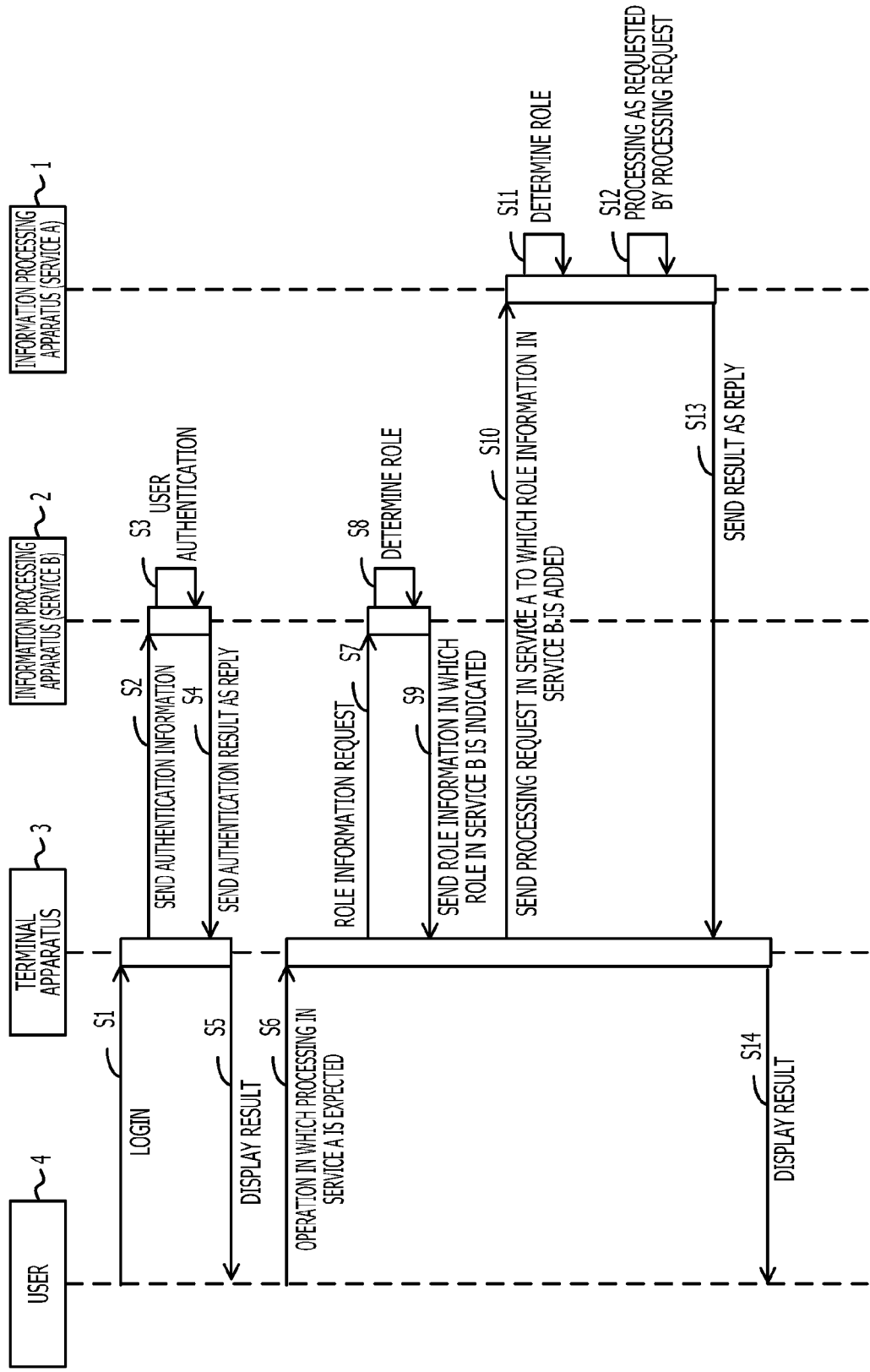
FIG. 2 is a sequence diagram illustrating a processing procedure in the first embodiment.

When one server provides services to users who have been individually authenticated by a plurality of other servers, each user may be given a service according to the role assigned to the user. When viewed from the one server, however, all the reliabilities of the users individually authenticated by the plurality of other servers are not the same.

For example, it is assumed that when developing a product, a first company entrusts part of development operations to a second company, which is capitalized by the first company, and a third company, which is not capitalized. If an employee, in charge of the development, who has been authenticated by a server in the capitalized second company accesses a server in the first company, which is the entrusting company, the employee may be able to be permitted to access a wide range of information. If an employee, in charge of the development, who has been authenticated by a server in the non-capitalized third company accesses a server in the entrusting first company, however, the range of information to which the employ is permitted to access may be substantially restricted. Thus, even when users have the same role of being in charge of the development, if they have been authenticated by different servers, it may be appropriate to provide different services to them.

However, with the conventional technologies, if a plurality of users having identical roles have been authenticated by different servers, it is not possible to assign different roles to the users according to the server by which the user has been authenticate and provide different services to the users. That is, it is not possible to determine an appropriate role to be assigned to a user who has been authenticated by another apparatus.

Embodiments of the present disclosure will be described below with reference to the drawings. These embodiments can be practiced in combination within a range in which no conflict occurs.

In a first embodiment, an appropriate role in a service is determined, the service being to be provided by the local apparatus for a user to which a role in an internal service (first service) provided by another apparatus has been assigned, according to the relationship between the other apparatus and the local apparatus and to the role assigned to the user in the other apparatus.

FIG. 1 is an example of the structure of a system in the first embodiment. In the first embodiment, an information processing apparatus 1, an information processing apparatus 2, and a terminal apparatus 3 are mutually connected with a network.

The information processing apparatus 1 includes a storage unit 1a, an authenticating unit 1b, a role information issuing unit 1c, a receiving unit id, a deciding unit 1e, a determining unit 1f, and a processing unit 1g.

The storage unit is stores a role definition 1aa, relationship information 1ab, a role assignment policy 1ac, and a service definition 1ad. The role definition 1aa is information that indicates a role in the first service, which is provided for each user. The relationship information 1ab is information that indicates a relationship between the local apparatus and another information processing apparatus in correspondence to a second service provided by the other information processing apparatus. The role assignment policy 1ac is information that defines a role in the first service, the role corresponding to a combination of a relationship between the first service and the second service and a role in the second service. The service definition 1ad is information that defines the range of a service allowed according to the role.

The authenticating unit 1b authenticates a user 4 in response to an authentication request from the terminal apparatus 3 in use by the user 4. For example, the authenticating unit 1b authenticates the user 4 depending on whether authentication information indicated in the authentication request matches prestored user's authentication information.

If user authentication succeeds, the role information issuing unit is references the role definition 1aa and determines a role, in the first service, assigned to the user who is using the terminal from which the authentication request has been sent. The role information issuing unit is sends, to the terminal apparatus 3, role information that indicates the first service and the role determined by the role information issuing unit 1c itself. The role information issuing unit 1c also sends, to the terminal apparatus 3, role information that indicates the first service and the role determined by the determining unit 1f.

The receiving unit id receives, from the terminal apparatus 3 in use by the user 4, the second service provided by the information processing apparatus 2, which is another information processing apparatus, and role information in which the role assigned to the user 4 in the second service is indicated.

The deciding unit le references the relationship information 1ab, extracts a relationship between the first service and the second service indicated in the received role information, and makes a decision. For example, the deciding unit le decides the relationship between the local apparatus and the other information processing apparatus, the relationship being indicated in correspondence to the second service indicated in the received role information, as the relationship between the first service and the second service indicated in the received role information.

The determining unit if references the role assignment policy 1ac and determines a role, in the first service, assigned to the user 4 who is using the terminal apparatus 3 from which the received role information had been sent, according to a combination of the relationship decided by the deciding unit 1e and the role indicated in the received role information.

The processing unit 1g references the service definition lad and executes processing of the first service within the range of a service allowed according to the role determined by the determining unit 1f.

The information processing apparatus 2 includes a storage unit 2a, an authenticating unit 2b, a role information issuing unit 2c, a receiving unit 2d, a deciding unit 2e, a determining unit 2f, and a processing unit 2g. The storage unit 2a stores a role definition 2aa, relationship information tab, a role assignment policy 1ac, and a service definition tad. The elements in the information processing apparatus 2 have almost the same functions as the elements with the same names in the information processing apparatus 1. The information items stored in the storage unit 2a are the same as the information items having the same names in the storage unit 1a.

The first service provided by the information processing apparatus 1 is the second service when viewed from the information processing apparatus 2. The first service provided by the information processing apparatus 2 is the second service when viewed from the information processing apparatus 1.

The terminal apparatus 3 includes an authentication requesting unit 3a, a role information acquiring unit 3b, and a processing requesting unit 3c.

The authentication requesting unit 3a sends an authentication request to an information processing apparatus for which the user 4 has an account, in response to a manipulation by the user 4.

The role information acquiring unit 3b acquires role information from the information processing apparatus by which the user 4 has been authenticated.

The processing requesting unit 3c sends a processing request to an information processing apparatus. For example, the processing requesting unit 3c sends a processing request in which role information acquired from one of the information apparatuses 1 and 2 is included to the other information processing apparatus.

With this system, the user 4 is authenticated by one information processing apparatus and then can receive a service provided by the other information processing apparatus. The service that the user 4 can received from the other information processing apparatus is determined according to the services provided by the information processing apparatus that has authenticated the user 4, the role assigned to the user 4 in these services, and the relationship among the services.

A processing procedure in the first embodiment will be described by using an example in which the user 4 is authenticated by the information processing apparatus 2 and receives a service from the information processing apparatus 1.

FIG. 2 is a sequence diagram illustrating a processing procedure in the first embodiment. In FIG. 2, a service provided by the information processing apparatus 1 is denoted by service A, a service provided by the information processing apparatus 2 is denoted by service B. It is assumed that the user 4 has an account for the information processing apparatus 2 but has no account for the information processing apparatus 1. It is also assumed that a trust-based relationship has been established between the provider of service A and the provider of service B and the relationship of service B to service A has been defined in the information processing apparatus 1. The processing illustrated in FIG. 2 is executed under this situation. The processing in FIG. 2 will be described below in the order of the step numbers.

S1: The user 4 performs a login operation on the terminal apparatus 3 to log in to the service of the information processing apparatus 2. For example, the user 4 enters his own the user ID and password.

S2: The authentication requesting unit 3a of the terminal apparatus 3 sends authentication information to the information processing apparatus 2. The authentication information is, for example, a combination of the user ID and password.

S3: The authenticating unit 2b of the information processing apparatus 2 authenticates the user 4 according to the authentication information received from the terminal apparatus 3. For example, the information processing apparatus 2 compares the authentication information received from the terminal apparatus 3 with prestored authentication information. If there is authentication information that matches the authentication information received from the terminal apparatus 3, the authenticating unit 2b authenticates the user 4 as a valid user having the ID indicated in the matching authentication information.

S4: The authenticating unit 2b in the information processing apparatus 2 sends an authentication result to the terminal apparatus 3 as a reply.

S5: The authentication requesting unit 3a in the terminal apparatus 3 displays a result in authentication processing.

S6: The user 4 enters, into the terminal apparatus 3, for which processing in service A is expected.

S7: The role information acquiring unit 3b in the terminal apparatus 3 recognizes that service A provided by the information processing apparatus 1 is expected to be processed, and thereby sends a role information request to the information processing apparatus 2 by which the user 4 has been authenticated.

S8: The role information issuing unit 2c in the information processing apparatus 2 references the role definition 1aa in response to the role information request and determines the role, in service B, of the user 4 who is using the terminal apparatus 3 from which the authentication request has been sent.

S9: The role information issuing unit 1c sends, to the terminal apparatus 3, service B and role information in which the role assigned to the user 4 in service B is indicated.

S10: The role information acquiring unit 3b of the terminal apparatus 3 acquires the role information sent from the information processing apparatus 2 and transfers the acquired role information to the processing requesting unit 3c. The processing requesting unit 3c receives the role information, adds the received role information to a processing request, and sends the processing request to the information processing apparatus 1.

S11: The receiving unit 1d of the information processing apparatus 1 receives the processing request to which the role information is added. The receiving unit 1d transfers the received role information to the deciding unit 1e. The deciding unit 1e references the relationship information 1ab and decides the relationship between the first service and the second service indicated in the role information received from the receiving unit 1d. The deciding unit 1e then notifies the determining unit 1f of the decided relationship. The determining unit 1f references the role assignment policy 1ac and determines the role, in service A, of the user 4 who is using the terminal apparatus 3 from which the received role information had been sent, according to a combination of the relationship decided by the deciding unit 1e and the role indicated in the received role information. The determining unit 1f notifies the processing unit 1g of the determined role.

S12: The processing unit 1g references the service definition 1ad and executes processing in service A, as requested by the processing request, within the range of a service allowed according to the role determined by the determining unit 1f.

S13: The processing unit 1g sends a processing result to the terminal apparatus 3 as a reply.

S14: The processing requesting unit 3c in the terminal apparatus 3 displays the processing result received from the processing unit 1g in the information processing apparatus 1.

Thus, the information processing apparatus 1 can provide appropriate service to the user 4. In a case, for example, in which a subsidiary of a company that manages the information processing apparatus 1 manages the information processing apparatus 2 and the user 4 is an employee at the subsidiary, the information processing apparatus 1 assigns a role of an employee at the subsidiary to the user 4 and can provide a service within a range appropriate for the role. In another case in which a business contact of a company that manages the information processing apparatus 1 manages the information processing apparatus 2 and the user 4 is an employee at the business contact, the information processing apparatus 1 assigns a role of an employee at the business contact to the user 4 and can provide a service within a range appropriate for the role. Thus, for example, the information processing apparatus 1 can provide a service to the employee at the subsidiary in a wider range than a service allowed to be provided to the employee at the business contact.

Since an appropriate role can be determined for a user authenticated by another information processing apparatus as described above, individual information processing apparatuses are freed from a burden of managing the account information of all users to which services are to be provided. For example, the information processing apparatus 1 can provide a service to the user 4 within an appropriate rage without managing the account information of the user 4. This reduces the burden of the system manager.

The authenticating units 1b and 2b, role information issuing units 1c and 2c, receiving units 1d and 2d, deciding units 1e and 2e, determining units 1f and 2f, and processing units 1g and 2g can be implemented by central processing units (CPUs) provided in the information processing apparatuses 1 and 2, respectively. The storage units 1a and 2a can be implemented by, for example, random access memories (RAMs) or hard disk drives (HDDs) provided in the information processing apparatuses 1 and 2, respectively.

The lines illustrated in FIG. 1 indicate part of communication paths through which elements are interconnected. Communication paths other than the illustrated communication paths can also be set.

Next, a second embodiment will be described. The second embodiment uses linked authentication to enable service to be provided even among servers that have no direct trust-based relationship.

For example, it is assumed that a first company entrusts a development operation to a second company, which is capitalized by the first company, and the second company entrusts part of the development operation to a third company, which is not capitalized. It is also assumed that a trust-based relationship has been established between the first company and the second company and between the second company and the third company, but has not established between the first company and the third company.

Even in this case, there is information that is expected to be shared among members involved in the development operation. For example, the first company, from which an order has been issued, may manage authentication information of all members involved in the development by using a server at the first company. When data about each member is managed at the company to which the member belongs, however, the data can be used more conveniently. Accordingly, each company has a server to manage development members. In this situation, it is preferable for users at the first company not only to access the server at the first company to view a development member list but also to access the server at the second company as development managers to view development members. In addition, even when there is no direct transaction relationship between the first company and the third company, it is preferable for users at the first company to access the server at the third company, to which an order has been issued from the second company, to view development members.

In this case in the second embodiment, since role authentication information is transferred in a chained manner, access is enabled from users at the first company to the server at the third company, which has no direct trust-based relationship with the first company.

Figure 3:
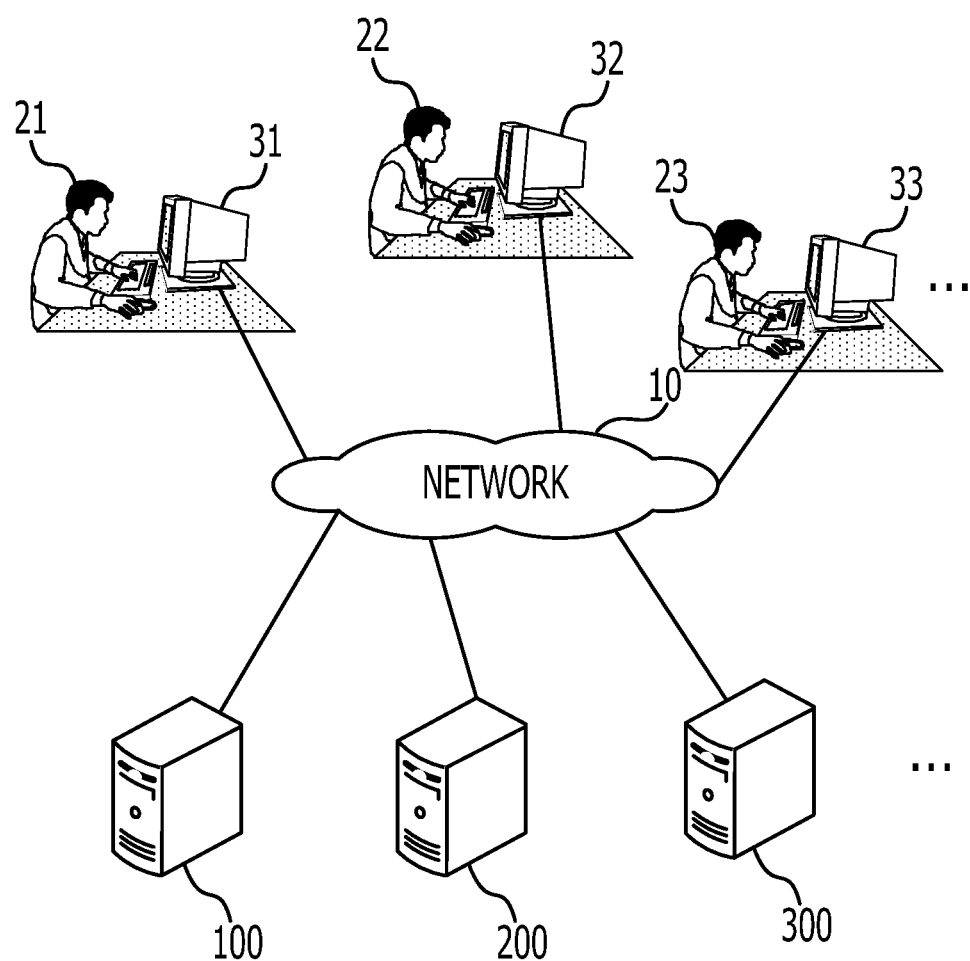
FIG. 3 is an example of the structure of a system in a second embodiment.

FIG. 3 is an example of the structure of a system in the second embodiment. In the second embodiment, a plurality of servers 100, 200, 300, and so on are mutually connected through a network 10. Terminal apparatuses 31, 32, 33, and so on, which are respectively used by a plurality of users 21, 22, 23, and so on, are connected to the network 10.

The users 21, 22, 23, and so on each have a user account for at least one of the plurality of servers 100, 200, 300, and so on.

For example, the user 21 has an account for the server 100, the user 22 has an account for the server 200, and the user 23 has an account for the server 300.

The servers 100, 200, 300, and so on each manage account information related to users who have accounts for the relevant server. The account information includes the authentication information and role information of the user. An example of the role information is a combination of the user ID and password of the user.

Figure 4:
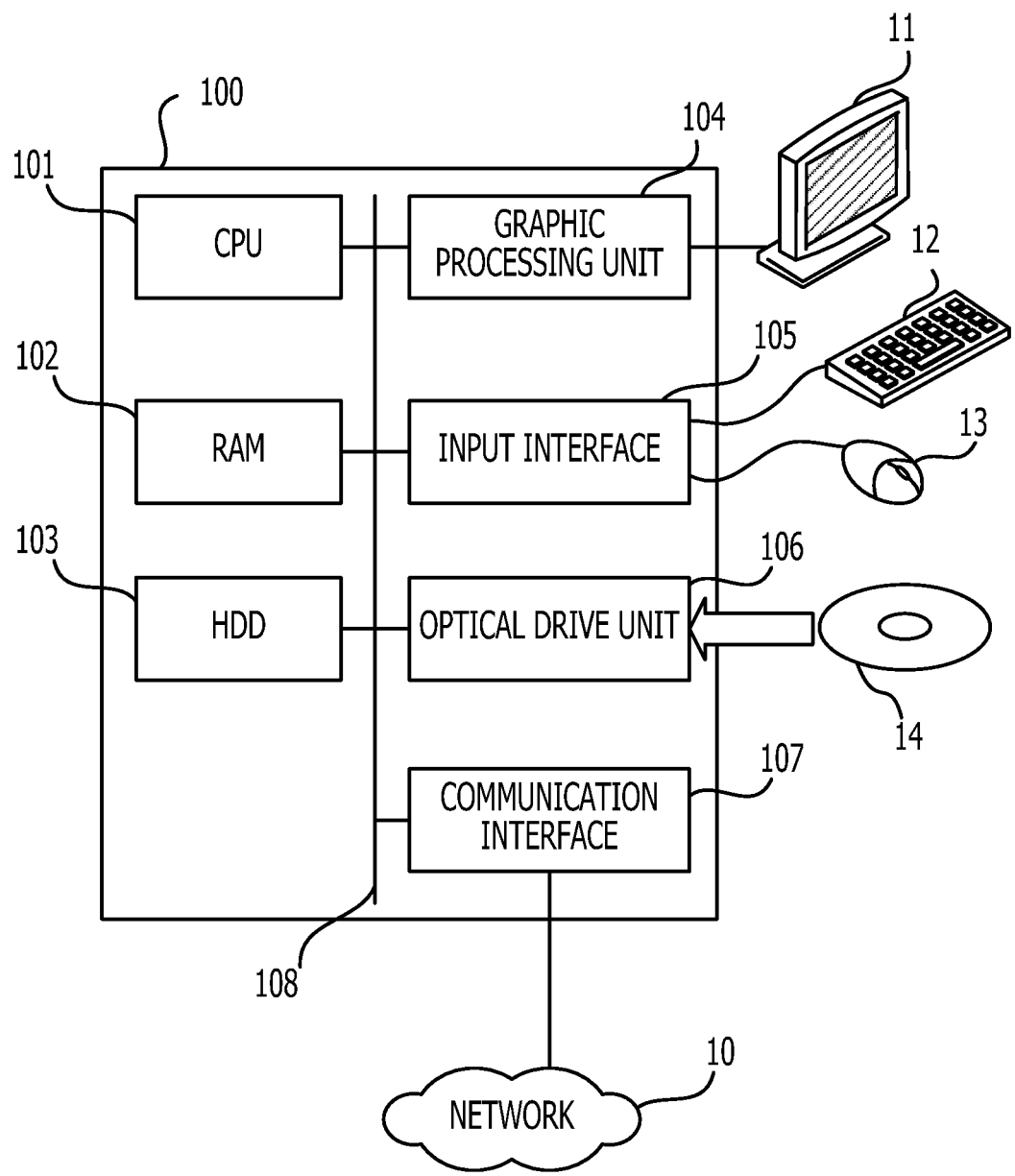
FIG. 4 is an example of the hardware structure of a server used in the second embodiment.

FIG. 4 is an example of the hardware structure of the server 100 used in the second embodiment. The whole of the server 100 is controlled by a CPU 101. A RAM 102 and a plurality of other peripheral units are connected to the CPU 101 through a bus 108. The number of CPUs provided in the server 100 is not limited to one; a plurality of CPUs may be provided. If the server 100 includes a plurality of CPUs, the plurality of CPUs operate in cooperation to control the whole of the server 100.

The RAM 102 is used as a main storage unit of the server 100. The RAM 102 temporarily stores at least part of an operating system (OS) and application programs executed by the CPU 101. The RAM 102 also stores various types of data used in processing executed by the CPU 101.

The peripheral units connected to the bus 108 include an HDD 103, a graphic processing unit 104, an input interface 105, an optical drive unit 106, and a communication interface 107.

The HDD 103, which is used as a secondary storage unit of the server 100, magnetically writes and reads data to and from a built-in disk. The HDD 103 stores the OS, application programs, and various types of data. A flash memory or another semiconductor storage unit can also be used as the secondary storage unit.

A monitor 11 is connected to the graphic processing unit 104. The graphic processing unit 104 displays an image on the screen of the monitor 11 in response to a command from the CPU 101. Examples of the monitor 11 include a display unit that uses a cathode ray tube (CRT) and a liquid crystal display unit.

A keyboard 12 and a mouse 13 are connected to the input interface 105. The input interface 105 receives signals sent from the keyboard 12 and mouse 13 and sends the received signals to the CPU 101. The mouse 13 is an example of a pointing device; another type of pointing device can also be used. Other types of pointing devices include a touch panel, a tablet, a touch pad, and a trackball.

The optical drive unit 106 uses laser beams or the like to read data recorded on an optical disk 14. The optical disk 14 is a transportable recording medium on which data is stored so that the data can be read by reflected light. Examples of the optical disk 14 include a digital versatile disc (DVD), a DVD-RAM, a compact disc read-only memory (CD-ROM), CD-recordable (CD-R), and CD-rewritable (CD-RW).

The communication interface 107, which is connected to the network 10, sends and receives data to and from other servers or communication units through the network 10.

The processing functions in the second embodiment can be implemented by a hardware structure as described above. Although an example of the hardware structure of the server 100 is illustrated in FIG. 4, other servers 200, 300, and so on and terminal apparatuses 31, 32, 33, and so on can also be implemented by a similar hardware structure. The information processing apparatuses 1 and 2 and the terminal apparatus 3 described in the first embodiment can also be implemented by a hardware structure similar to the hardware structure of the server 100 illustrated in FIG. 4.

In this system, each user can receive a service from a server for which the user has no account, according to the role.

Figure 5:
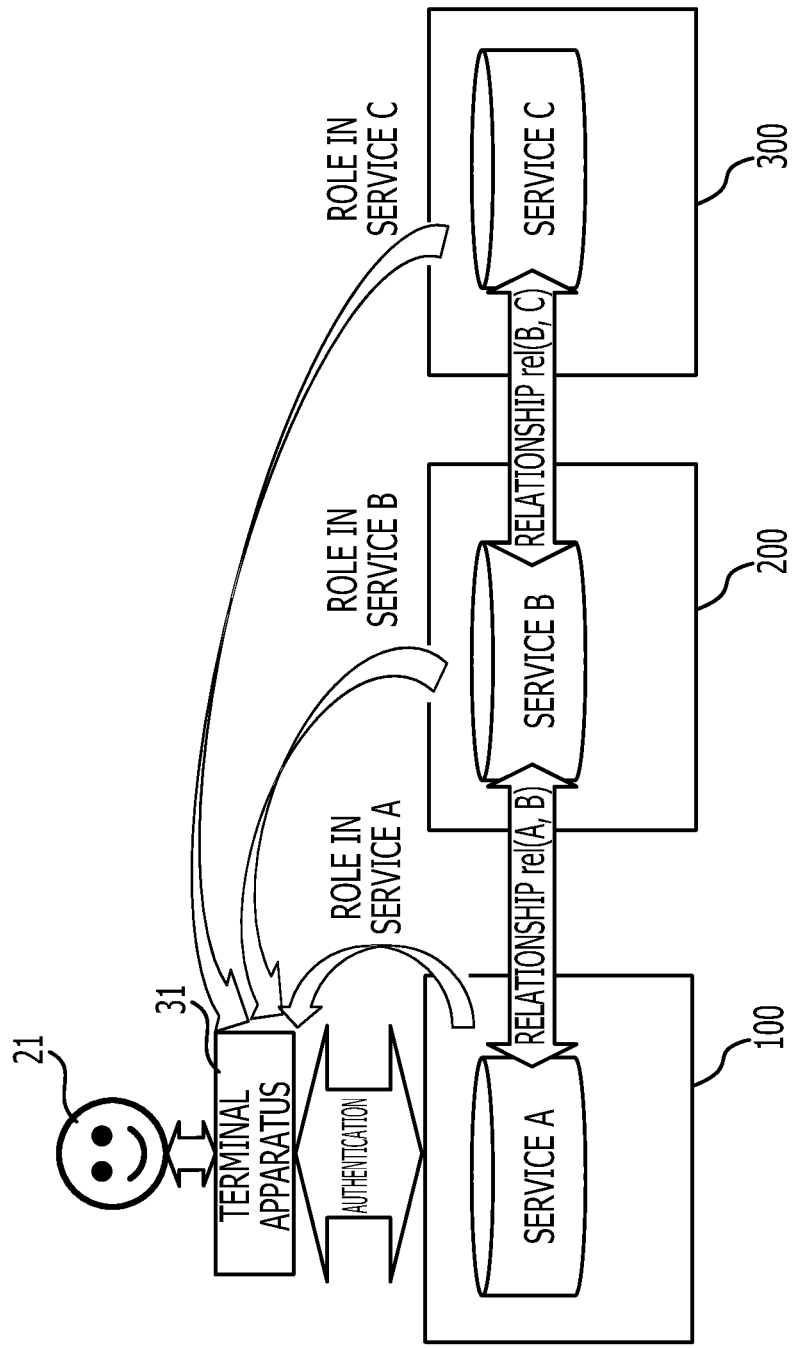
FIG. 5 outlines linked authentication processing.

FIG. 5 outlines linked authentication processing. In the example in FIG. 5, a service provided by the server 100 is referred to as service A, a service provided by the server 200 is referred to as service B, and a service provided by the server 300 is referred to as service C.

If managers of the servers 100, 200, and 300 mutually have a trust-based relationship, a relationship is defined in the servers managed by two managers who mutually have a trust-based relationship, on the basis of the trusted-based relationship,. In the example in FIG. 5, a relationship rel(A, B) is defined between the server 100 and the server 200 for services provided by them, a relationship rel(B, C) is defined between the server 200 and the server 300 for services provided by them, and no relationship is defined between the server 100 and the server 300 for services provided by them.

As an example, a user 21 having an account for the server 100 is assumed to have used the terminal apparatus 31 to carry out a series of procedures in user authentication between the terminal apparatus 31 and the server 100. The terminal apparatus 31 in use by the user 21, who has been authenticated by the server 100, can acquire the role assigned to the user 21 in service A from the server 100, the role being defined in the server 100.

Then, the terminal apparatus 31 notifies the server 200 of the role in service A, after which the terminal apparatus 31 can acquire the role assigned to the user 21 in service B from the server 200. The server 200 determines the role assigned to the user 21 in service B according to a combination of the relation rel(A, B) predefined between the server 100 and the server 200 and the role assigned to the user 21 in service A, the role being received from the terminal apparatus 31.

In addition, the terminal apparatus 31 notifies the server 300 of the role in service B, after which the terminal apparatus 31 can acquire the role assigned to the user 21 in service C from the server 300. The server 300 determines the role assigned to the user 21 in service C according to a combination of the relation rel(B, C) predefined between the server 200 and the server 300 and the role assigned to the user 21 in service B, the role being received from the terminal apparatus 31.

The terminal apparatus 31 can receive service from each of the servers 100, 200, and 300 according to the role assigned to the user 21 in the service provided by the server. That is, if the user 21 follows servers in succession to which the user 21 is related and acquires a role from each server, then the user 21 can receive service corresponding to the role from the server 300 which has no direct relationship with the server 100, by which the user 21 has been authenticated. In principle, therefore, roles can be acquired in a chained manner without limitation.

Functions of each server, which implement processing as illustrated in FIG. 5, will be described.

Figure 6:
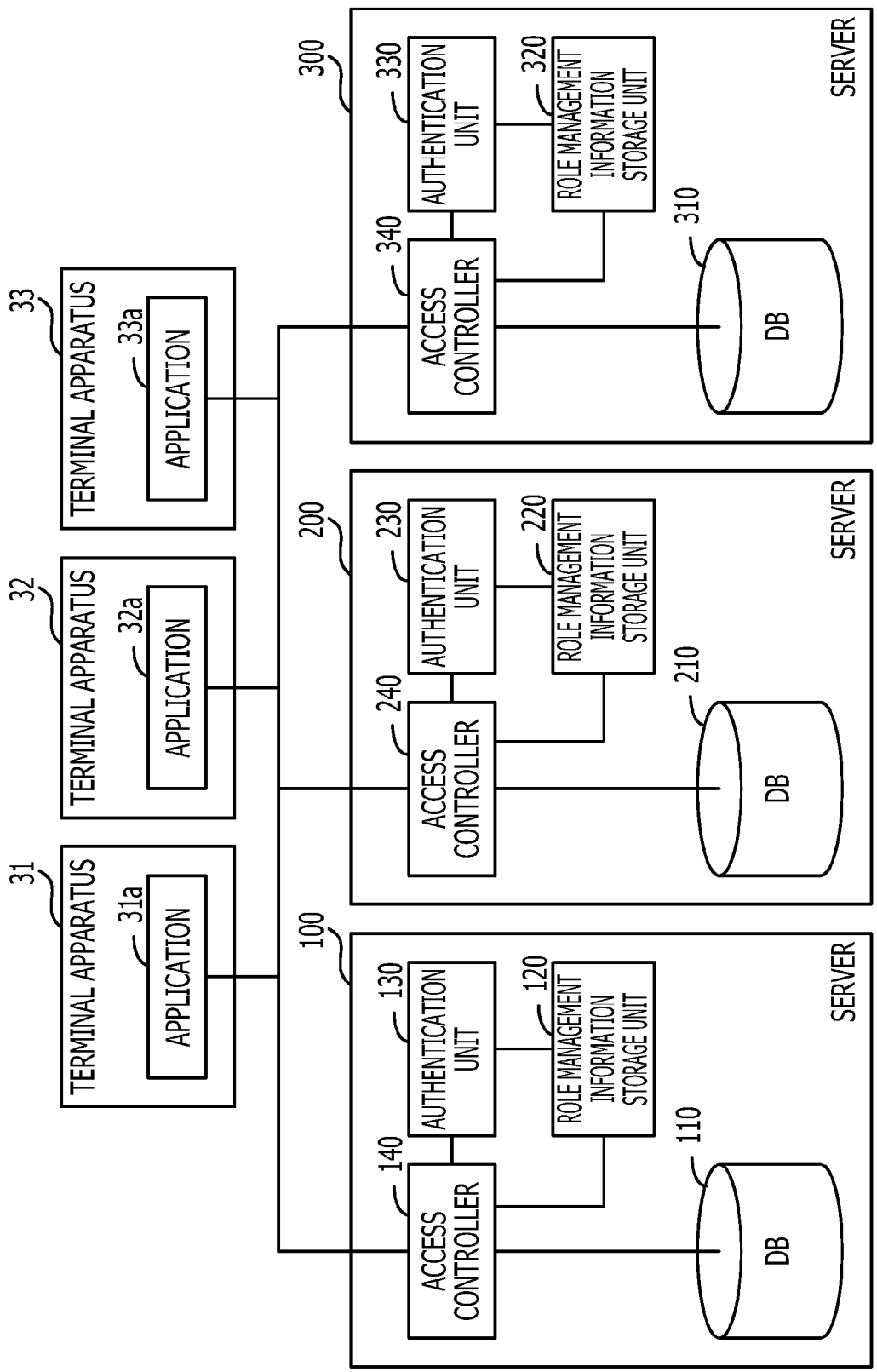
FIG. 6 is an example illustrating the functions of individual units in the second embodiment.

FIG. 6 is an example illustrating the functions of individual units in the second embodiment. An application 31a is being executed in the terminal apparatus 31. The application 31a is a function implemented when the terminal apparatus 31 executes application software. The application 31a sends a service request to a server in response to an input manipulated by the user 21 and uses a service within a range appropriate for a role determined by the server. Before sending the service request to the server, the application 31a sends a token issuing request to the server and acquires a token in which a role in the service provided by the server is included. The token is information proving that the user has a right to use a service provided by the server within a range appropriate for the determined role. The application 31a can send an authentication request to a server for which the user 21 has an account so that the user 21 is authenticated.

Similarly, applications 32a and 33a are being respectively executed in the terminal apparatuses 32 and 33. The applications 32a and 33a have functions similar to the functions of the application 31a in the terminal apparatus 31.

The server 100 includes a database 110, a role management information storage unit 120, an authentication unit 130, and an access controller 140.

The database 110 stores data provided by service A, which data providing service. As an example of the database 110, part of a storage area in the HDD 103 is used.

The role management information storage unit 120 stores information (role policy) related to a rule used to determine the role assigned to a user. For example, the role policy includes definitions of rules used to determine a role, in the service of the server, assigned to the user authenticated by the server, a relationship between the server and another server, and a role, in the service of the server, assigned to a user authenticated by another server. As an example of the role management information storage unit 120, part of a storage area in the RAM 102 or HDD 103 is used.

The authentication unit 130 references the role management information storage unit 120 to authenticate a user who has requested a service and determines a role of the authenticated user. For example, the authentication unit 130 decides whether authentication information included in the authentication request sent from the terminal apparatus 31 is correct, in response to the authentication request. An example of the authentication information is a combination of the user ID and a credential (trust information). As an example of the credential, a password can be used. Other examples of the credential are fingerprint information about the user, palmar intravenous information, and other biological information.

The authentication unit 130 creates a token that includes a role associated in advance with the user 21 who is using the terminal apparatus 31, in response to a token issuing request from the terminal apparatus 31. The authentication unit 130 outputs the created token as a processing result.

In addition, the authentication unit 130 references the role management information storage unit 120 in response to a service request that includes a token issued by another server, and determines the role assigned to the user who has requested service. For example, as the role assigned to the user, the authentication unit 130 determines a role corresponding to a combination of a role assigned to the user by the other server and a relationship between the other server and the server 100 itself. The authentication unit 130 then creates a token which includes the role assigned to the user who has requested service. The authentication unit 130 then outputs the created token as a processing result.

The access controller 140 extracts information from the database 110 in response to a service request from the terminal apparatus 31, and sends the extracted information to the terminal apparatus 31. At the time of the extraction of information from the database 110, the access controller 140 extracts only information within a range appropriate for the role assigned to the user of the terminal apparatus 31. When receiving an authentication request or token issuing request from the terminal apparatus 31, the access controller 140 transfers the received authentication request or token issuing request to the authentication unit 130. When receiving, from the authentication unit 130, the result of processing carried out in response to an authentication request or token issuing request, the access controller 140 sends the received result to the terminal apparatus 31.

The server 200 includes a database 210, a role management information storage unit 220, an authentication unit 230, and an access controller 240. Similarly, the server 300 includes a database 310, a role management information storage unit 320, an authentication unit 330, and an access controller 340. The elements in the servers 200 and 300 have the same functions as the elements with the same names in the server 100.

The lines illustrated in FIG. 6 indicate part of communication paths through which elements are interconnected. Communication paths other than the illustrated communication paths can also be set. The role management information storage units 120, 220, and 320 in FIG. 6 are examples of the storage units 1s and 2a in the first embodiment in FIG. 1. The authentication units 130, 230, and 330 in FIG. 6 are examples of the functions of a combination of the authenticating units 1b and 2b, role information issuing units 1c and 2c, receiving units 1d and 2d, deciding units 1e and 2e, and determining units 1f and 2f in the first embodiment in FIG. 1. The access controllers 140, 240, and 340 in FIG. 6 are examples of processing units 1g and 2g in FIG. 1.

Next, information stored in the role management information storage unit 120 will be described in detail.

Figure 7:
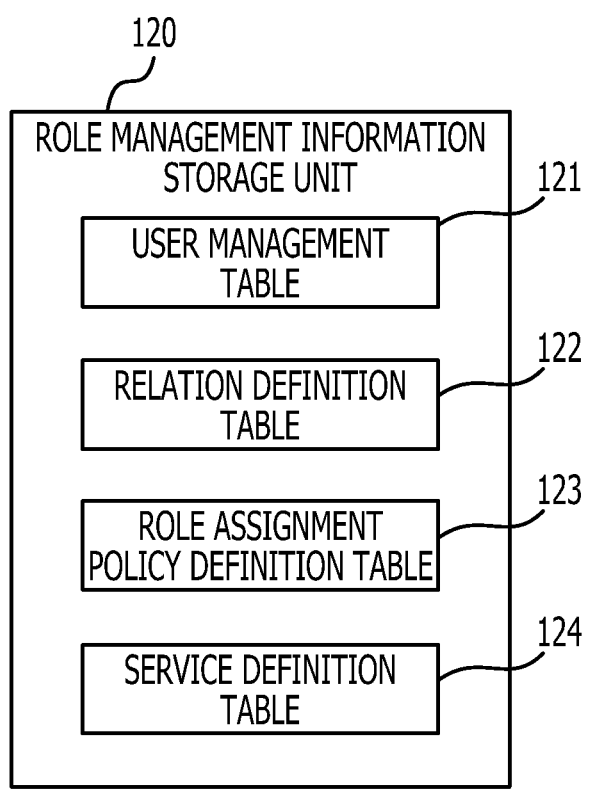
FIG. 7 is an example of information stored in a role management information storage unit.

FIG. 7 is an example of information stored in the role management information storage unit 120. The role management information storage unit 120 stores a user management table 121, a relationship definition table 122, a role assignment policy definition table 123, and a service definition table 124.

The user management table 121 is a data table that manages local users who have an account for the server 100. For example, the user management table 121 includes, for example, the settings of the user IDs, roles, and passwords of individual users.

The relationship definition table 122 is a data table that manages a combination of a relationship between an organization that manages the server 100 and another organization having a trust-based relationship with that organization and the identification information of a server managed by the other organization.

The role assignment policy definition table 123 is a data table that defines a policy of role assignment to a user having a role in the other server.

The service definition table 124 is a data table in which a service is set for each user's role.

The data structures of the data tables stored in the role management information storage unit 120 will be described.

Figure 8:
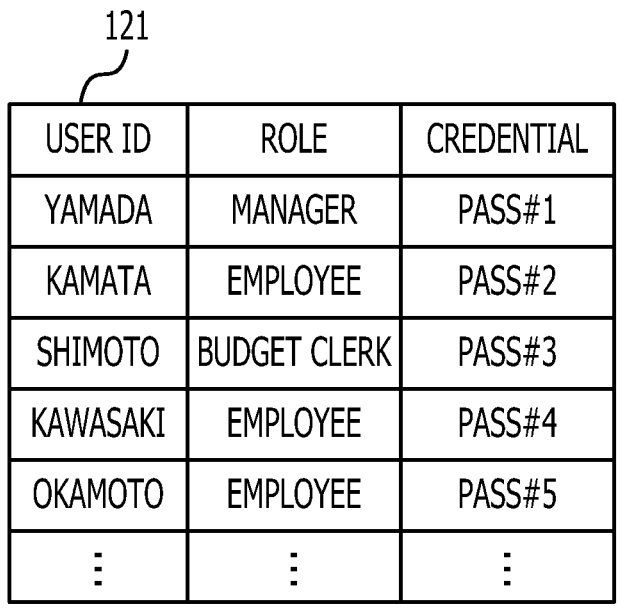
FIG. 8 is an example illustrating the structure of data in a user management table.

FIG. 8 is an example illustrating the structure of data in the user management table 121. The user management table 121 has a field of user IDs, a field of roles, and a field of credentials. Data items in these fields on the same row constitute a record used to manage the user having an account for the server 100.

The user ID field includes the identifiers of users. The role field includes the roles assigned to users in service A provided by the server 100. The credential field includes trust information used in user authentication. As an example of the trust information, a password can be used. If the identifier of a service in which a role has been set is set to "s" and the identifier of a user who has a role is set to "u", then the role is represented by, for example, a function role(s, u).

The user management table 121 described above is used to authenticate a user and determine the role assigned to the user. If, for example, the server 100 receives, from the terminal apparatus 31, an authentication request in which a combination of a user ID and a password (this combination is referred to as authentication information) is included, the authentication unit 130 searches the user management table 121 for a record that matches the authentication information included in the authentication request. If there is a matching record, the authentication unit 130 authenticates the user 21 who is using the terminal apparatus 31 from which the authentication request has been sent as the user indentified by the user ID included in the matching record. The authentication unit 130 decides that the role set in the matching record is the role, in service A, assigned to the user 21 who is using the terminal apparatus 31.

Records in the user management table 121 illustrated in FIG. 8 are examples of role definitions 1aa and 2aa in the first embodiment illustrated in FIG. 1.

Figure 9:
FIG. 9 is an example illustrating the structure of data in a relationship definition table.

FIG. 9 is an example illustrating the structure of data in the relationship definition table 122. The relationship definition table 122 has a field of uniform resource locators (URLs) of partners and a field that represents relationships with partners. Data items in these fields on the same row constitute a record that indicates a definition of a relationship with another server.

The "URL of partner" field includes URLs assigned to services, each of which is provided by a server managed by another organization having a direct trust relationship with the organization that manages the server 100 (the other server is referred to as the partner server). The "relationship with partner" field includes relationships, each of which is between the organization that manages the server 100 and an organization that manages the partner server. Examples of the relationship with the partner include business contacts, subsidiaries, and consolidated subsidiaries.

Records in the relationship definition table 122 illustrated in FIG. 9 are examples of relationship information items 1ab and 2ab in the first embodiment illustrated in FIG. 1.

Figure 10:
FIG. 10 is an example illustrating the structure of data in a role assignment policy definition table.

FIG. 10 is an example illustrating the structure of data in the role assignment policy definition table 123. The role assignment policy definition table 123 has a field of relationships with partners, a field of roles recognized by the partners, and a field of roles recognized by the own server. Data items in these fields on the same row constitute a record that defines a role in a service provided by the server 100, the role being to be set for a user who has a role in a service provided by another server.

The "relationship with partner" field includes relationships, each of which is between the organization that manages the server 100 and an organization that manages a partner server. The "partner-recognized role" field includes roles, each of which is set by a partner server for a user. The "own server-recognized role" field includes roles, each of which is assigned by the server 100 itself for a user having a role in a service provided by a partner server.

Records in the role assignment policy definition table 123 illustrated in FIG. 10 are examples of role assignment policies 1ac and 2ac in the first embodiment illustrated in FIG. 1.

Figure 11:
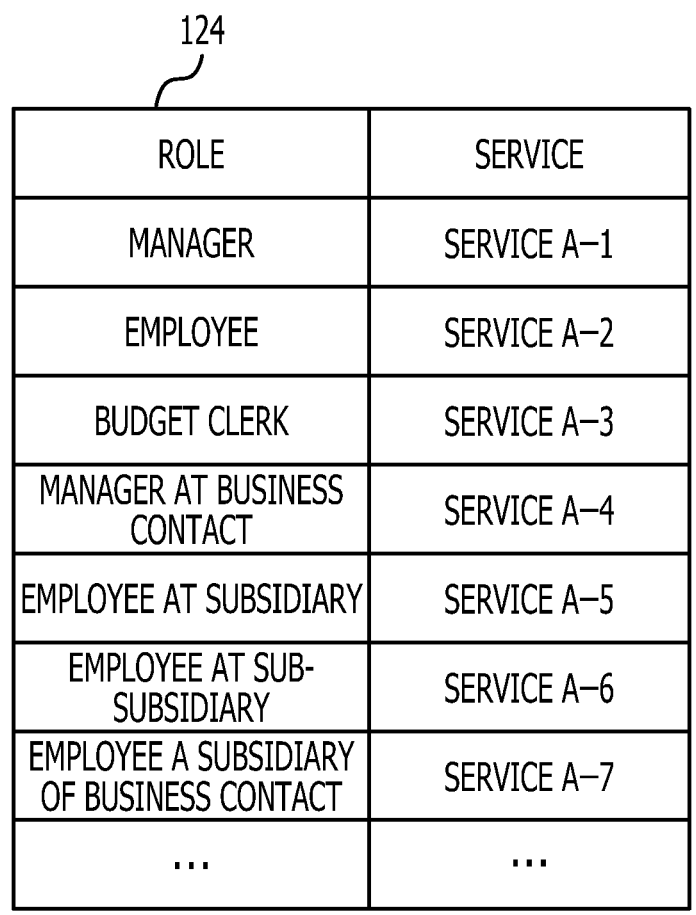
FIG. 11 is an example illustrating the structure of data in a service definition table.

FIG. 11 is an example illustrating the structure of data in the service definition table 124. The service definition table 124 has a field of roles and a field of services. Data items in these fields on the same row constitute a record that defines a service corresponding to the relevant role.

The "role" field includes roles of users. The "service" field includes services, each of which is provided to a user having relevant role. It is defined for a service whether, for example, access to all data items in the database 110 is allowed or access is limited only to data items having some attributes. If, for example, the role assigned to a user is a budget clerk, a service is set so that access to data related to the budget is allowed. If the role assigned to the user is an employee, a service is set so that access to, for example, a list of all employees at the company that manages the server 100 is allowed. If the role assigned to the user is an employee at a subsidiary, a service is set so that access to, for example, a list of representatives of departments at the company that manages the server 100 is allowed.

Records in the service definition table 124 illustrated in FIG. 11 are examples of the service definitions lad and tad in the first embodiment illustrated in FIG. 1.

FIGS. 7 to 11 each have illustrated the data structure of a table stored in the role management information storage unit 120 in the server 100. Identical data having identical structures are stored in the role management information storage units 220 and 320 of other servers 200 and 300 as well.

Each server can use the data described above to set, for a user having a role in a service provided by a partner server, a role corresponding to a combination of the role and the partner server, and to provide a service corresponding to the role setting.

In the second embodiment, a token is used to transfer information in which a role between servers is indicated. The token will be described below.

Figure 12:
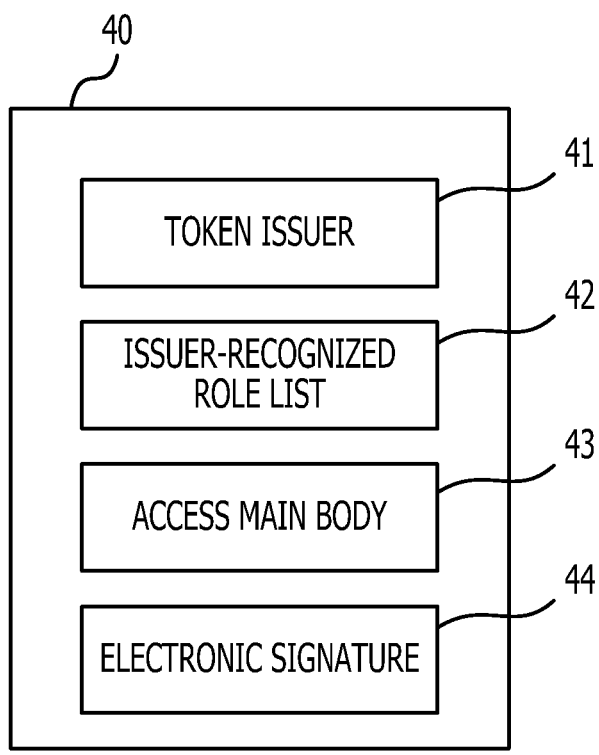
FIG. 12 is an example of information included in a token.

FIG. 12 is an example of information included in a token 40. The token 40 includes a token issuer 41, an issuer-recognized role list 42, an access main body 43, and an electronic signature 44.

The token issuer 41 is the identifier of a server that has issued the token 40. As an example of the server identifier, URL of the server is used.

The issuer-recognized role list 42 is a list of roles certified by the token issuer 41 as the roles of users. If a single user has a plurality of roles, the plurality of roles are set in the list.

The access main body 43 is the identifier of a user who makes an access.

The electronic signature 44 is information assigned by the token issuer 41 of the token 40 to assure the validity of the token 40.

If it is assumed that the identifier of the token issuer 41 is "I", the identifier of the user is "u", and the role of service "s" set for the user is "role(s, u)", then the token 40 is represented as, for example, T (issuer=I, subject=u, role=role(s, u)).

As an example of the format of the token 40, the Assertion format of Security Assertion Markup Language (SAML) 2.0 can be used.

A procedure providing a service corresponding to the relevant role will be described.

Figure 13:
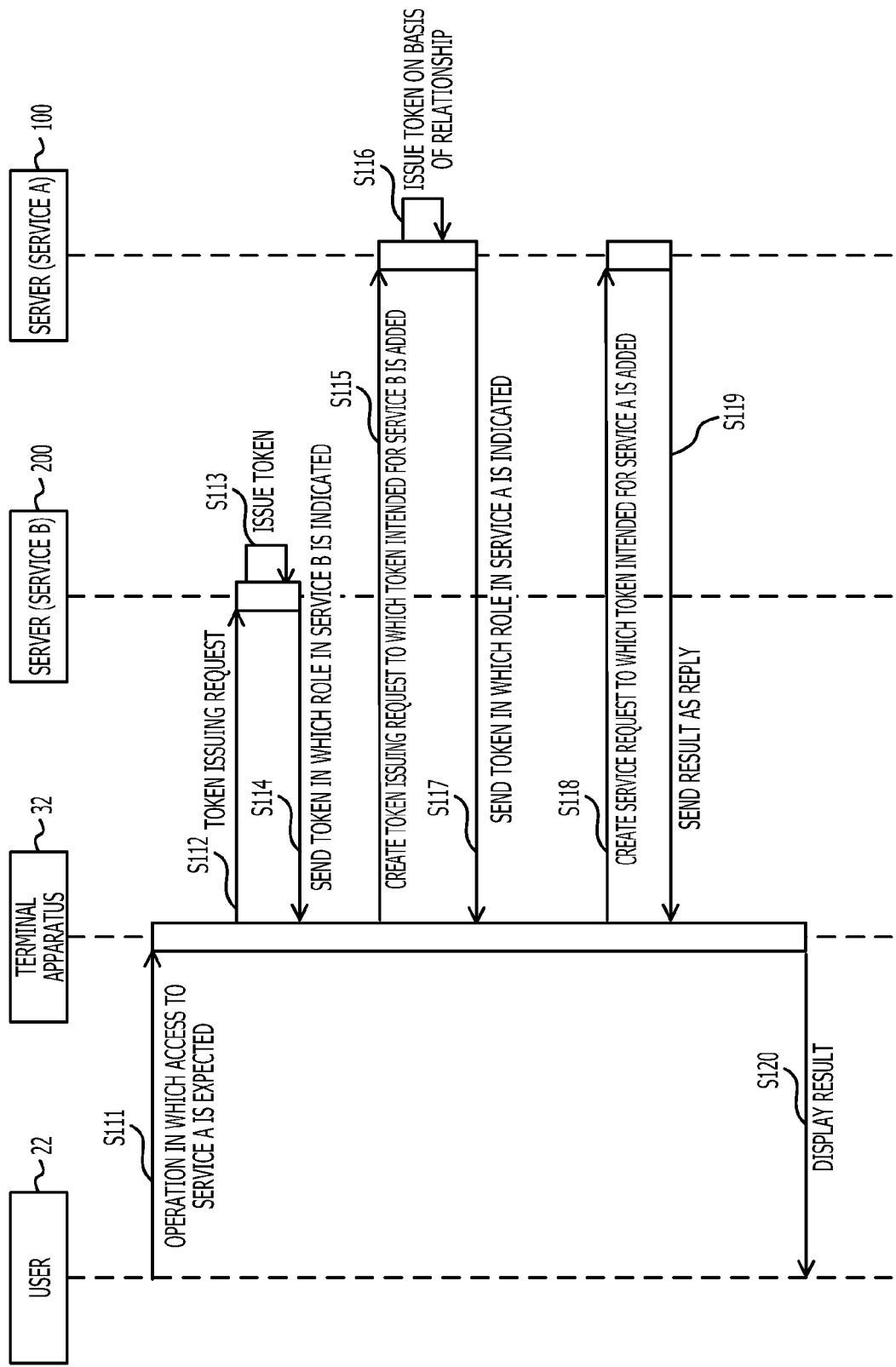
FIG. 13 is a sequence diagram illustrating an example of a procedure of service providing processing.

FIG. 13 is a sequence diagram illustrating an example of a procedure of service providing processing. In the example in FIG. 13, the user 22 has an account for the server 200 and uses a service provided by the server 100. In the processing illustrated in FIG. 13, it is assumed that the user 22 has already been authenticated by the server 200 through the terminal apparatus 32 and a role in service B has been assigned to the user 22. It is also assumed that the identifier of the server 100 is "a", the identifier of the server 200 is "b", and the identifier of the user 22 is 1.

S111: The user 22 operates the terminal apparatus 32 to command the application 32a to perform processing that expects an access to service A.

S112: The application 32a in the terminal apparatus 32 sends a token issuing request to the server 200 in response to the operation by the user 22.

S113: In the server 200, the access controller 240 receives the token issuing request and transfers the received token issuing request to the authentication unit 230. Then, the authentication unit 230 issues a token T (issuer=b, subject=1, role=role(B, 1)) that proves the role role(B, 1) assigned to the user 22 in service B.

S114: The authentication unit 230 in the server 200 sends the token, in which a role in service B is indicated, the token being intended for server B, through the access controller 240 to the terminal apparatus 32.

S115: The application 32a in the terminal apparatus 32 creates a token issuing request, in service A, to which the token intended for service B is added. The application 32a then sends the token issuing request in service A to the server 100.

S116: The access controller 140 in the server 100 receives the token issuing request and transfers the received token issuing request to the authentication unit 130. The authentication unit 130 carries out relationship-based token issuing processing. For example, the authentication unit 130 first verifies the validity of the token by using, for example, an electronic signature technology. The authentication unit 130 then issues a token T that proves the role role(A, 1) assigned to the user 22 in service A according to the relationship rel(A, B) with service B and to role role(B, 1) assigned to the user 22 in service B. It is assumed that in the role assignment policy, the issuing of the role role(A, 1) is defined for the user having the role role(B, 1) in service B, the user having been personally authenticated by the server 200 linked through the relationship rel(A, B). The token T is represented as, for example, T (issuer=a, subject=1, role=role(A, 1)).

Since the token issued by the server 200 is added to the token issuing request, the authentication unit 130, for example, authenticates the role assigned to the user 22 in service A, according to the relationship with the server 200. For example, the authentication unit 130 searches the "URL of partner" field of the relationship definition table 122 for a record corresponding to the server's identifier indicated in the token issued by the server 200. The authentication unit 130 then decides the relationship with the partner in the record as the relationship with the server 200. Next, the authentication unit 130 searches the "relationship with partner" field and "partner-recognized role" field in the role assignment policy definition table 123 for a record corresponding to a combination of the relationship with the server 200 and the role indicated in the token issued by the server 200. The authentication unit 130 then acquires a role recognized by the own server from the record. The authentication unit 130 certifies the acquired role as the role assigned to the user 22 in service A. The authentication unit 130 then creates a token to which the certified role is added.

S117: The authentication unit 130 in the server 100 sends the token, in which a role in service A is indicated, the token being intended for service A, through the access controller 140 to the terminal apparatus 32.

S118: The application 32a in the terminal apparatus 32 creates a service request, in service A, to which the token that is intended for service A and has been acquired from the server 100 is added. The application 32a then sends the service request in service A to the server 100.

S119: The access controller 140 in the server 100 executes processing within the range of the service corresponding to the role assigned to the user 22, the role being indicated in the service request, after which the access controller 140 sends a processing result as a reply. For example, the access controller 140 searches the service definition table 124 for a record that includes the role indicated in the service request. The access controller 140 recognizes the range of a service that can be allowed for the user 22, according to the service defined in the searched-for record. The access controller 140 executes processing corresponding to the service request within the range of the service that can be allowed, after which the access controller 140 sends an execution result to the terminal apparatus 32. If, for example, the service request is a request to acquire information from the database 110, the access controller 140 acquires information from the database 110 within the range corresponding to the role assigned to the user 22, and sends the acquired information to the terminal apparatus 32.

S120: Upon receipt of the processing result from the server 100, the terminal apparatus 32 displays the processing result on the monitor 11.

Thus, the user 22 having an account for the server 200 can use a service provided by the server 100. The service provided by the server 100 to the user 22 is determined according to the role assigned to the user 22 in service B and to the relationship defined between the 100 and the server 200. As a result, the server 100 can provide a service to the user 22 in an appropriate range.

Next, a procedure by which a server issues a token to a user whom the server itself has authenticated will be described below in detail.

Figure 14:
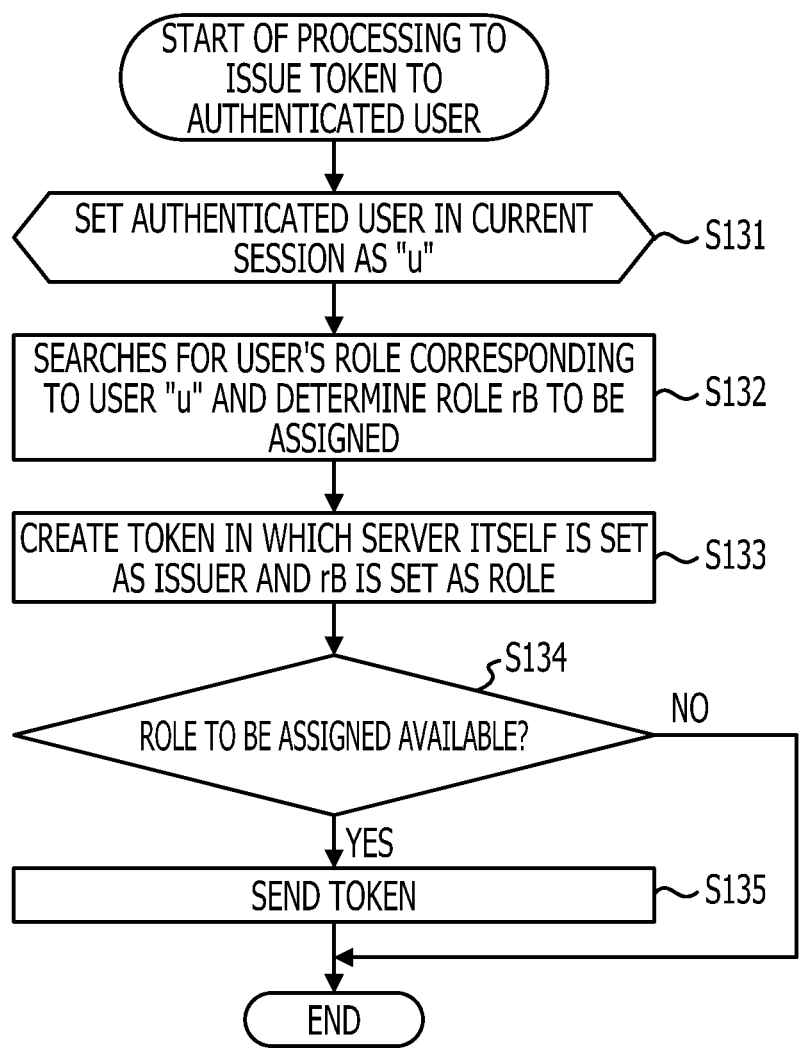
FIG. 14 is a flowchart illustrating a procedure of processing by which a server issues a token to a user whom the server itself has authenticated.

FIG. 14 is a flowchart illustrating a procedure of processing by which a server issues a token to a user whom the server itself has authenticated. The processing in FIG. 14 will be described below in the order of the step numbers. The processing described below is executed when a token issuing request is received from the terminal apparatus 32 in use by the user 22 who has already been authenticated.

S131: The authentication unit 230 sets an authenticated user in the current session as "u".

S132: The authentication unit 230 searches the user management table 121 for a record corresponding to the user "u" and determines a role rB for the user S133: The authentication unit 230 creates a token in which the server 200 itself is set as the issuer and rB is set as the role.

S134: The authentication unit 230 determines whether there is a role to be assigned. If, for example, a role is set in the record found in the search in S132, the authentication unit 230 decides that there is a role to be assigned. If no role is set in the record found in the search in S132, the authentication unit 230 decides that there is no role to be assigned. If there is a role to be assigned, the authentication unit 230 causes the processing to proceed to S135. If there is no role to be assigned, the authentication unit 230 terminates the processing without issuing a token.

S135: The authentication unit 230 sends the token created in S133 to the terminal apparatus 32.

The server 200, for which the user 22 has an account, issues a token by this procedure.

Next, a procedure of token issuing processing based on a relationship with another server will be described, the procedure being executed by the server 100 in response to a token issuing request to which the token issued by the server 200 is added.

Figure 15:
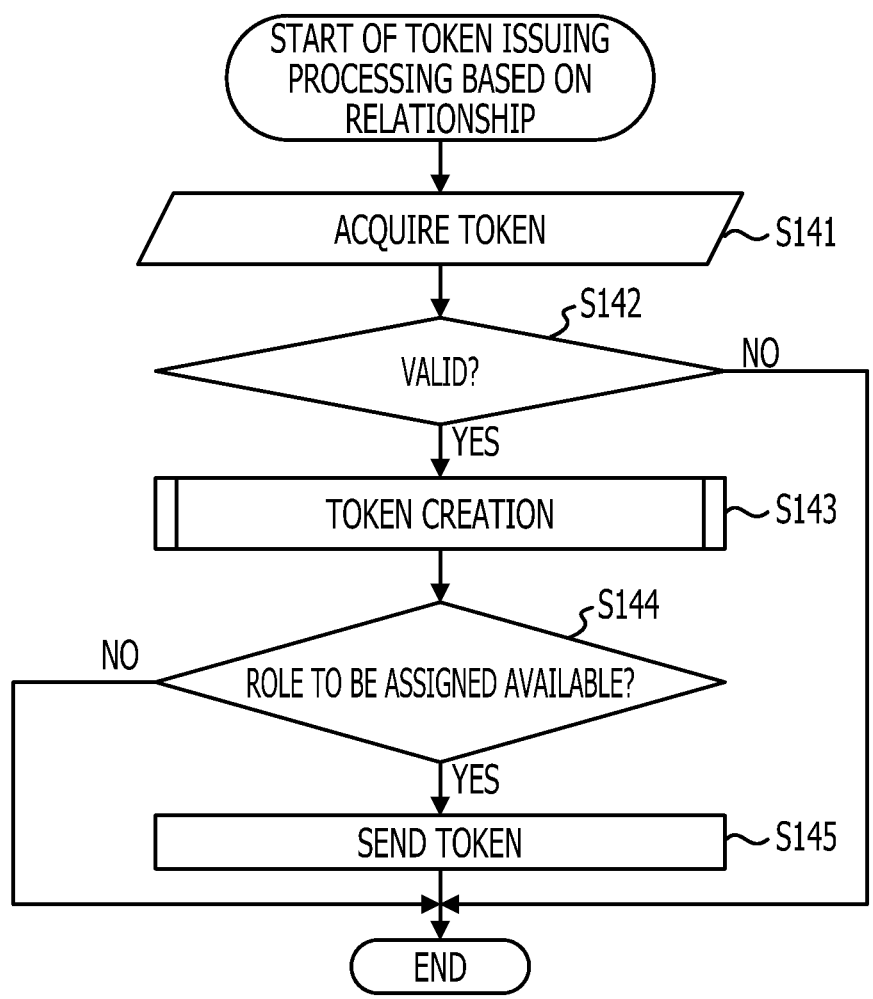
FIG. 15 is a flowchart illustrating an example of a procedure of token issuing processing based on a relationship.

FIG. 15 is a flowchart illustrating an example of a procedure of token issuing processing based on a relationship. The processing in FIG. 15 will be described below in the order of the step numbers.

S141: The authentication unit 130 acquires a token issued by the server 200

S142: The authentication unit 130 decides whether the acquired token is valid or invalid. If, for example, a valid electronic signature is added to the token, the authentication unit 130 decides that the token is valid. If the token is valid, the authentication unit 130 causes the processing to proceed to S143. If the token is invalid, the authentication unit 130 terminates the processing without issuing a token.

S143: The authentication unit 130 creates a token. Processing to create a token will be described later in detail with reference to FIG. 16.

S144: The authentication unit 130 determines whether there is a role to be assigned. If, for example, a token in which a role in service A is set has been created as a result of the token creation processing, the authentication unit 130 decides that there is role to be assigned. If a token has failed to be created in the token creation processing due to no role, the authentication unit 130 decides that there is no role to be assigned. If there is a role to be assigned, the authentication unit 130 causes the processing to proceed to S145. If there is no role to be assigned, the authentication unit 130 terminates the processing without issuing a token.

S145: The authentication unit 130 sends the token created in S143 to the terminal apparatus 32.

Next, token creation processing will be described in detail.

Figure 16:
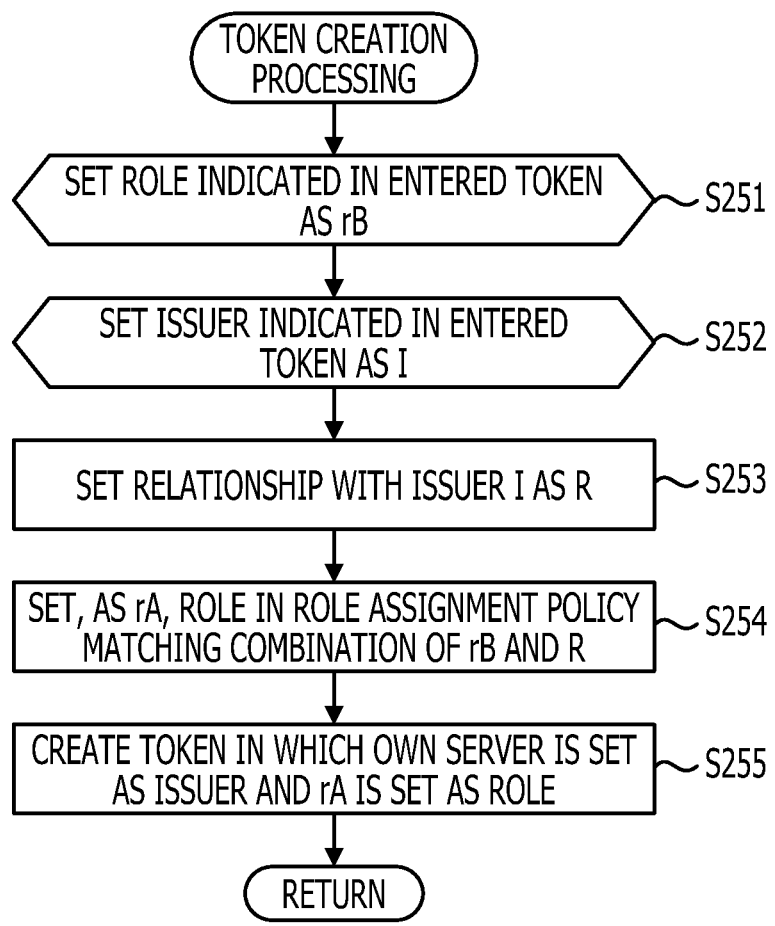
FIG. 16 is a flowchart illustrating an example of a procedure of token creation processing.

FIG. 16 is a flowchart illustrating an example of a procedure of token creation processing. The processing in FIG. 16 will be described below in the order of the step numbers.

S151: The authentication unit 130 sets the role indicated in the entered token as rB.

S152: The authentication unit 130 sets the issuer indicated in the entered token as I.

S153: The authentication unit 130 searches the relationship definition table 122 for a record that includes a relationship definition matching the issuer I and sets the relationship with the partner indicated in the searched-for record as R.

S154: The authentication unit 130 searches the role assignment policy definition table 123 for a record that includes a role assignment policy matching a combination of the role rB and the relationship R. The authentication unit 130 then acquires the role recognized by the own server from the searched-for record and sets the role as rA.

S155: The authentication unit 130 creates a token in which the server itself is set as the issuer and rA is set as the role and to which an electronic signature is added. The access main body indicated in the entered token is set as the access main body in the token to be created.

As described above, the user 22 who has been authenticated by the server 200 can be assigned a role in service A provided by the server 100 according to the role in service B provided by the server 200. The role assigned to the user 22 is determined according to a combination of the relationship between the server 100 and the server 200 and the role assigned to the user 22 in service B provided by the server 200.

Even if a direct relationship is not defined between the server 100 and the server 300, if the user 23 has an account for the server 300 and a role is assigned to the user 23 in a chained manner, the user 23 can use service A provided by the server 100. Processing to provide a service by assigning a role in a chained manner will be described below.

Figure 17:
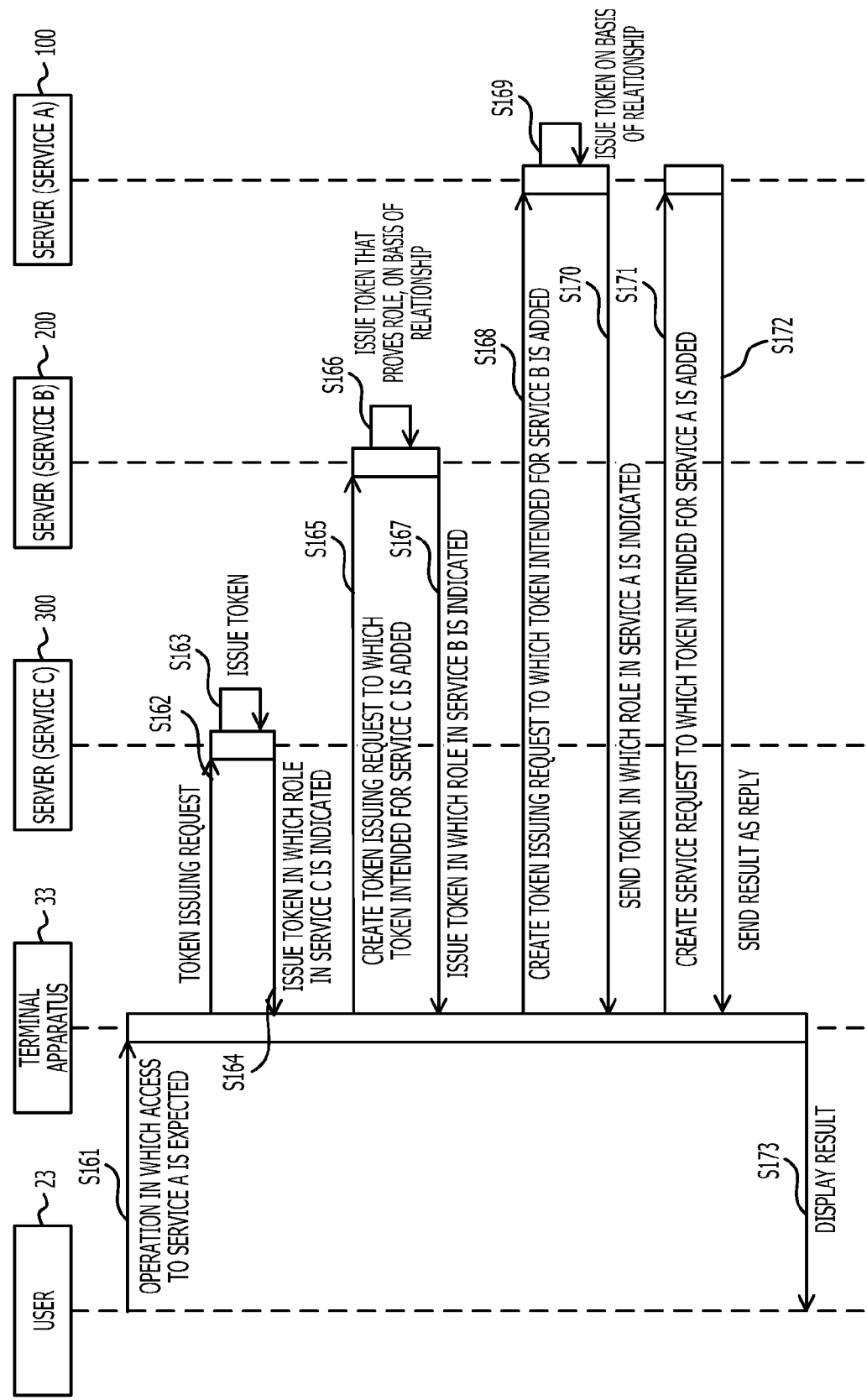
FIG. 17 is a sequence diagram illustrating an example of a procedure of processing to provide a service in a chained manner.

FIG. 17 is a sequence diagram illustrating an example of a procedure of processing to provide a service in a chained manner. FIG. 17 illustrates an example in which the user 23 has an account for the server 300 and uses a service provided by the server 100. In processing in FIG. 17, the user 23 is assumed to have been already authenticated by the server 300 on the terminal apparatus 33 and have a determined role in service C. The identifier of the server 100 is "a", the identifier of the server 200 is "b", the identifier of the server 300 is "c", and the identifier of the user 23 is 2. It is also assumed that an indirect relationship is defined in the application 33a between the server 300 and the server 100 with the server 200 therebetween.

S161: The user 23 operates the terminal apparatus 33 to command the application 33a to perform processing that expects an access to service A.

S162: The application 33a in the terminal apparatus 33 sends a token issuing request to the server 300 in response to the operation by the user 23.

S163: In the server 300, the access controller 340 receives the token issuing request and transfers the received token issuing request to the authentication unit 330. Then, the authentication unit 330 issues a token T (issuer=c, subject=2, role=role(C, 1)) that proves the role role(C, 1) in service C.

S164: The authentication unit 330 in the server 300 sends the token, intended for server C, in which a role in service C is indicated, through the access controller 340 to the terminal apparatus 33.

S165: The application 33a in the terminal apparatus 33 creates a token issuing request in service B, to which the token intended for service C is added, the token being received from the server 300. The application 33a then sends the token issuing request in service B to the server 200.

S166: The access controller 240 in the server 200 receives the token issuing request and transfers the received token issuing request to the authentication unit 230. The authentication unit 230 verifies the validity of the token. The authentication unit 230 then issues a token T that proves the role role(B, 2) assigned to the user 23 in service B according to the role assignment policy based on the relationship rel(B, C) with service C. The token T is represented as, for example, T (issuer=b, subject=2, role=role(B, 2)).

S167: The authentication unit 230 in the server 200 sends the token, intended for server B, in which a role in service B is indicated, through the access controller 240 to the terminal apparatus 33.

S168: The application 33a in the terminal apparatus 33 creates a token issuing request in service A, to which the token intended for service B is added, the token being received from the server 200. The application 33a then sends the token issuing request in service A to the server 100.

S169: The access controller 140 in the server 100 receives the token issuing request and transfers the received token issuing request to the authentication unit 130. The authentication unit 130 verifies the validity of the token. The authentication unit 130 then issues a token T that proves the role role(A, 1) assigned to the user 23 in service A according to the role assignment policy based on the relationship rel(A, B) with service B. The token T is represented as, for example, T (issuer=a, subject=1, role=role(A, 1)).

S170: The authentication unit 130 in the server 100 sends the token, intended for server A, in which a role in service A is indicated, through the access controller 140 to the terminal apparatus 33.

S171: The application 33a in the terminal apparatus 33 creates a service request in service A, to which the token intended for service A is added, the token being received from the server 100. The application 33a then sends the service request in service A to the server 100.

S172: The access controller 140 in the server 100 executes processing within the range of the service corresponding to the role assigned to the user 23, the role being indicated in the service request, after which the access controller 140 sends a processing result as a reply.

S173: Upon receipt of the processing result from the server 100, the terminal apparatus 33 displays the processing result on the monitor 11.

If a role is assigned in a chained manner as described above, the server 100 can provide service A to the user 23 on the server 300 that does not have a direct relationship with the server 100. In addition, a service to be provided is determined according to the relationship between the server 100 and the server 200, to the relationship between the server 200 and the server 300, and to the role assigned to the user 23 in service C provided by the server 300. Thus, even if a user has the same role assigned by different servers for which the user has accounts, different services can be provided to the user.

An example of a business operation executed by using a plurality of services in cooperation will be described below with reference to FIG. 18.

Figure 18:
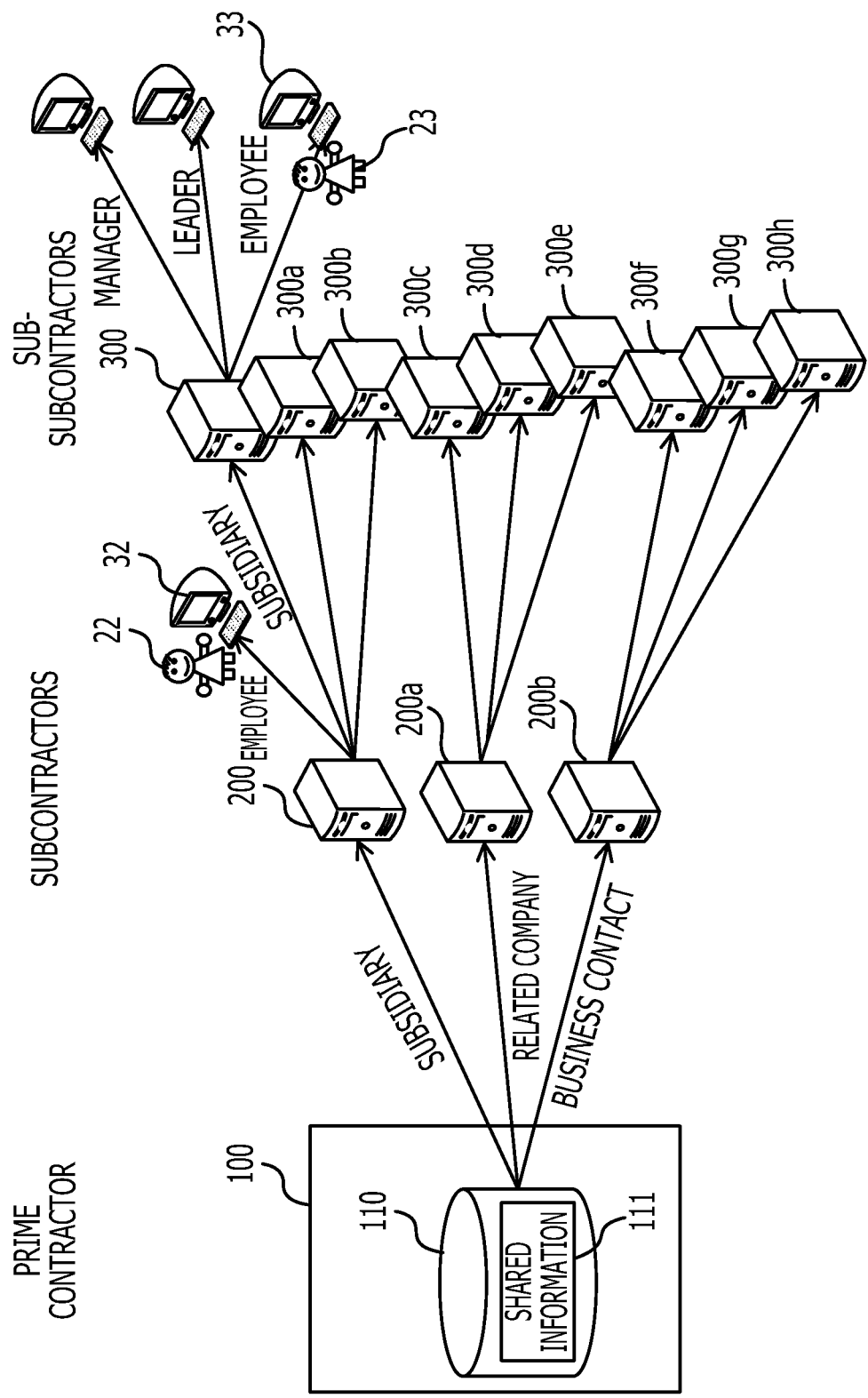
FIG. 18 is an example of a business operation that is executed by using a plurality of services in cooperation.

FIG. 18 illustrates an example of services used in cooperation by a typical software development project.

For example, it is assumed that a software development project is being carried out by one prime contractor, three subcontractors, and nine subs-subcontractors. A plurality of members are engaged in the project at each company.

The server 100 is managed by the primary contractor. The servers 200, 200a, and 200b are managed by the subcontractors. The servers 300, 300a, 300b, 300c, 300d, 300e, 300f, 300g, and 300h are managed by the sub-subcontractors. Each server stores the account information (such as user IDs and passwords) of the members engaged in the project at the company that manages the server. Each server uses the stored account information to perform user authentication for managers and employees at the company that manages the server.

In the server 100, a relationship between the server 100 and the server 200 is defined as a subsidiary. In the server 200, however, the relationship between the server 100 and the server 200 is defined as a parent company. In the server 200, a relationship between the server 200 and the server 300 is defined as a subsidiary. In the server 300, however, the relationship between the server 200 and the server 300 is defined as a parent company. In the server 200, the role assigned to the user 22 is defined as an employee. In the server 300, the role assigned to the user 23 is defined as an employee.

In a situation in which relations are defined as described above, information shared by the members engaged in the project (the information is referred to as shared information 111) is stored in the database 110 in the server 100 at the prime contractor. When the server 100 at the prime contractor receives a token issuing request to which a token indicating a role of "employee" is added from the terminal apparatus 32 in use by the user 22 authenticated by the server 200, the server 100 issues a token that indicates a role of "employee at subsidiary". Then, the user 22 can access information, in the shared information 111 managed by the server 100, that is allowed in a range according to the role of "employee at subsidiary".

When the server 200 at the subcontractor receives a token issuing request to which a token indicating a role of "employee" is added from the terminal apparatus 33 in use by the user 23 authenticated by the server 300, the server 200 issues a token that indicates a role of "employee at subsidiary". Then, when the server 100 at the prime contractor receives a token issuing request to which a token indicating the role of "employee at subsidiary" is added from the terminal apparatus 33, the server 100 issues a token that indicates a role of "employee at sub-subsidiary". Then, the user 23 can access information, in the shared information 111 managed by the server 100, that is allowed in a range according to the role of "employee at sub-subsidiary".

Thus, at the server 100 at the prime contractor, it is possible to allow each member to access the shared information 111 without the accounts of all members being managed at a single place. It is also possible to restrict access of each member to the shared information 111 according to the relationship between the prime contractor and the company to which the member belongs and to the role of the member at the company to which the member belongs. That is, it is possible to finely control access of each member to the shared information 111 without the accounts of all members being managed at the server 100 at the prime contractor.

In the second embodiment, a server for which the user has an account issues a token in which a role in service is indicated in response to a token issuing request from a user who has been successfully authenticated. Before this token is issued, the server can send, for example, a token in which the issuer-recognized role list 42 in the token 40 illustrated in FIG. 12 is not included to the terminal apparatus in use by the authenticated user in advance. This type of token uses a less amount of data than the token 40 in FIG. 12. The terminal apparatus in use by the user sends an access request to which this type of token that uses a less amount of data is added to the server at which the user was authenticated. Thus, the user can receive a service corresponding to the role assigned to the user from the server at which the user was authenticated. As long as the user uses a service provided by the server for which the user has an account, a token with a less amount of data can be used, improving processing efficiency.

Next, a third embodiment will be described. In the third embodiment, a first token used for cooperation is issued at the same time as the time of user authentication. The structure of a system that implements the third embodiment is almost the same as in the second embodiment. Accordingly, like elements are denoted by like reference characters in the second embodiment in FIGS. 2 to 12, and only processing that differs between the second embodiment and the third embodiment will be described.

In the second embodiment, a server has issued a token in response to a token issuing request output from a terminal in use by an authenticated user. In the third embodiment, however, a token is issued at the same time as the time of user authentication. Accordingly, the number of communications can be reduced that are carried out between the terminal apparatus and the server until a token is issued.

Figure 19:
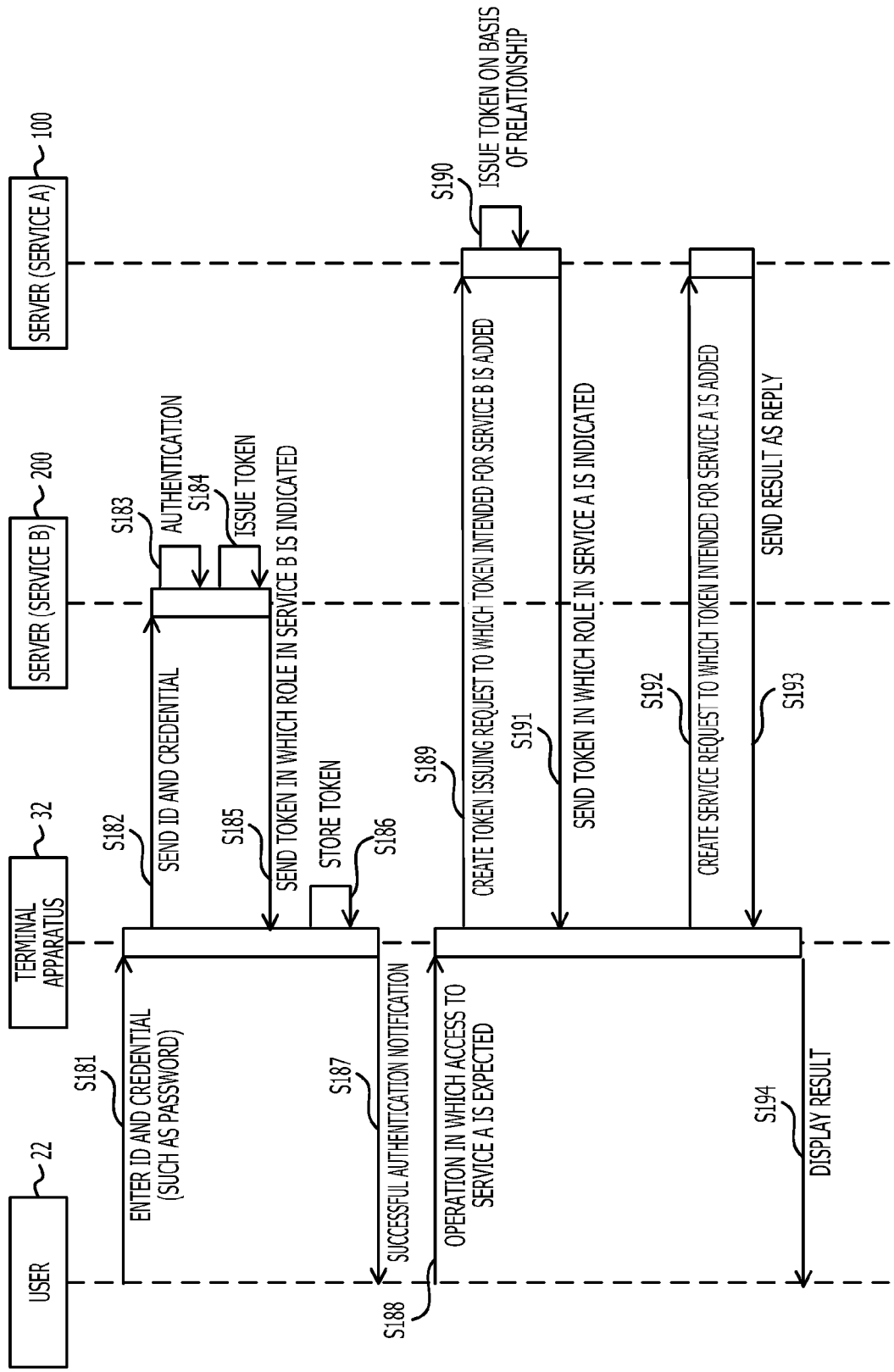
FIG. 19 is a sequence diagram illustrating an example of a procedure of service providing processing in a third embodiment.

FIG. 19 is an example of a procedure of service providing processing in the third embodiment. In the example in FIG. 19, the user 22 has an account for the server 200 and uses a service provided by the server 100.

S181: The user 22 operates the terminal apparatus 32 to enter a user ID and a credential (such as a password) into the application 32a.

S182: The application 32a in the terminal apparatus 32 sends a combination of the user ID and credential to the server 200 in response to the operation by the user 22.

S183: In the server 200, the access controller 240 receives the combination of the user ID and credential and transfers the received combination of the user ID and credential to the authentication unit 230. The authentication unit 230 authenticates the user according to the combination of the user ID and credential. If, for example, there is a record corresponding to the combination of the user ID and credential in the user management table 121, the authentication unit 230 authenticates the user 22 as a valid user.

S184: Upon successful user authentication, the authentication unit 230 issues a token that proves the role assigned to the user 22 in service B.

S185: The authentication unit 230 in the server 200 sends the token, intended for server B, in which a role in service B is indicated, through the access controller 240 to the terminal apparatus 32.

S186: The application 32a in the terminal apparatus 32 receives the token intended for service B from the server 200 and stores the received token in a RAM or another memory.

S187: The application 32a displays a successful authentication notification on the monitor 11.

S188: The user 22 operates the terminal apparatus 32 to command the application 32a to perform processing that expects an access to service A.

S189: The application 32a in the terminal apparatus 32 sends a token issuing request to the server 200 in response to the operation by the user 22.

Subsequent processing in S190 to S194 is the same as in S115 to S120 in FIG. 13

As described above, the number of communications can be reduced by issuing a token at the same time as the time of user authentication.

Next, a fourth embodiment will be described. In the fourth embodiment, information, which is a destination, is added to a token; the information identifies another server that can use the token to authenticate a role in cooperation. If a server receives a token issuing request to which a token issued from another server is added, only when the server is specified as the destination indicated in the added token, the server issues a token. This suppresses the token from being abused.

If, for example, the server 200, which provides service B, has not sufficiently ensured information security, a token issued from the server 200 may leak to a malicious third party. In the second and third embodiments, a malicious third party can illegally obtain a token and can disguise himself as a user having an account for the server 200 by using the illegally obtained token. That is, a malicious third party can receive services from all servers that each have a definition of a relationship with the server 200 on the basis of a trust relationship. In the fourth embodiment, therefore, a destination is included in a token to suppress services from being illegally used.

The structure of a system that implements the fourth embodiment is similar to the structure in the second embodiment. Accordingly, like elements are denoted by like reference characters in the second embodiment in FIGS. 2 to 12, and only processing that differs between the second embodiment and the fourth embodiment will be described.

Figure 20:
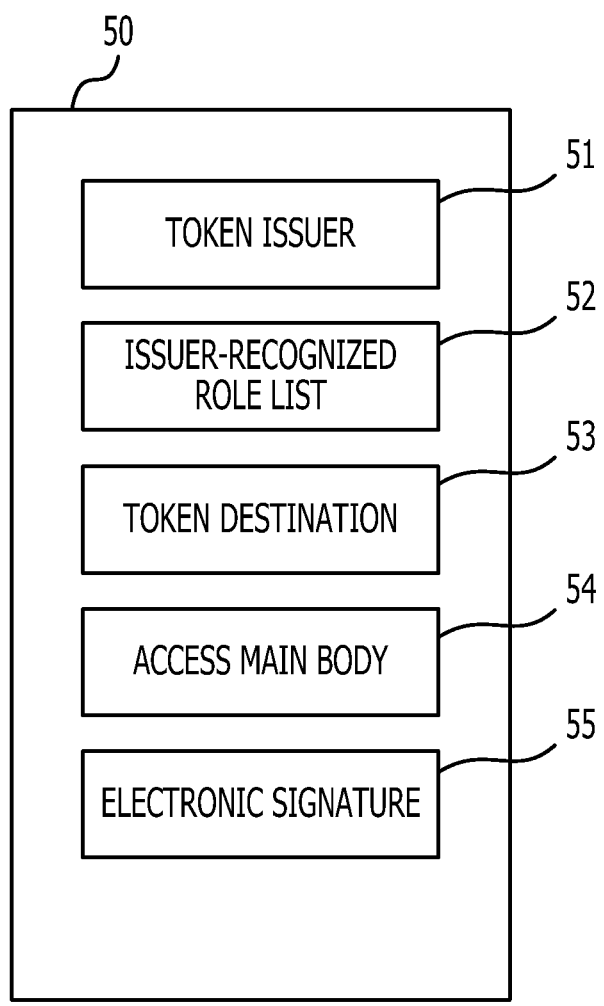
FIG. 20 is an example of information included in a token in a fourth embodiment.

FIG. 20 is an example of information included in a token 50 in the fourth embodiment. The token 50 includes a token issuer 51, an issuer-recognized role list 52, a token destination 53, an access main body 54, and an electronic signature 55. The token issuer 51, issuer-recognized role list 52, access main body 54, and electronic signature 55 have the same information as the information items having the same names in the token 40 in the second embodiment illustrated in FIG. 12.

The token destination 53 is information that identifies a server that can use the token 50. For example, the URL of a server that can use the token 50 is set as the token destination 53.

A service providing procedure corresponding to a role will be described below.

Figure 21:
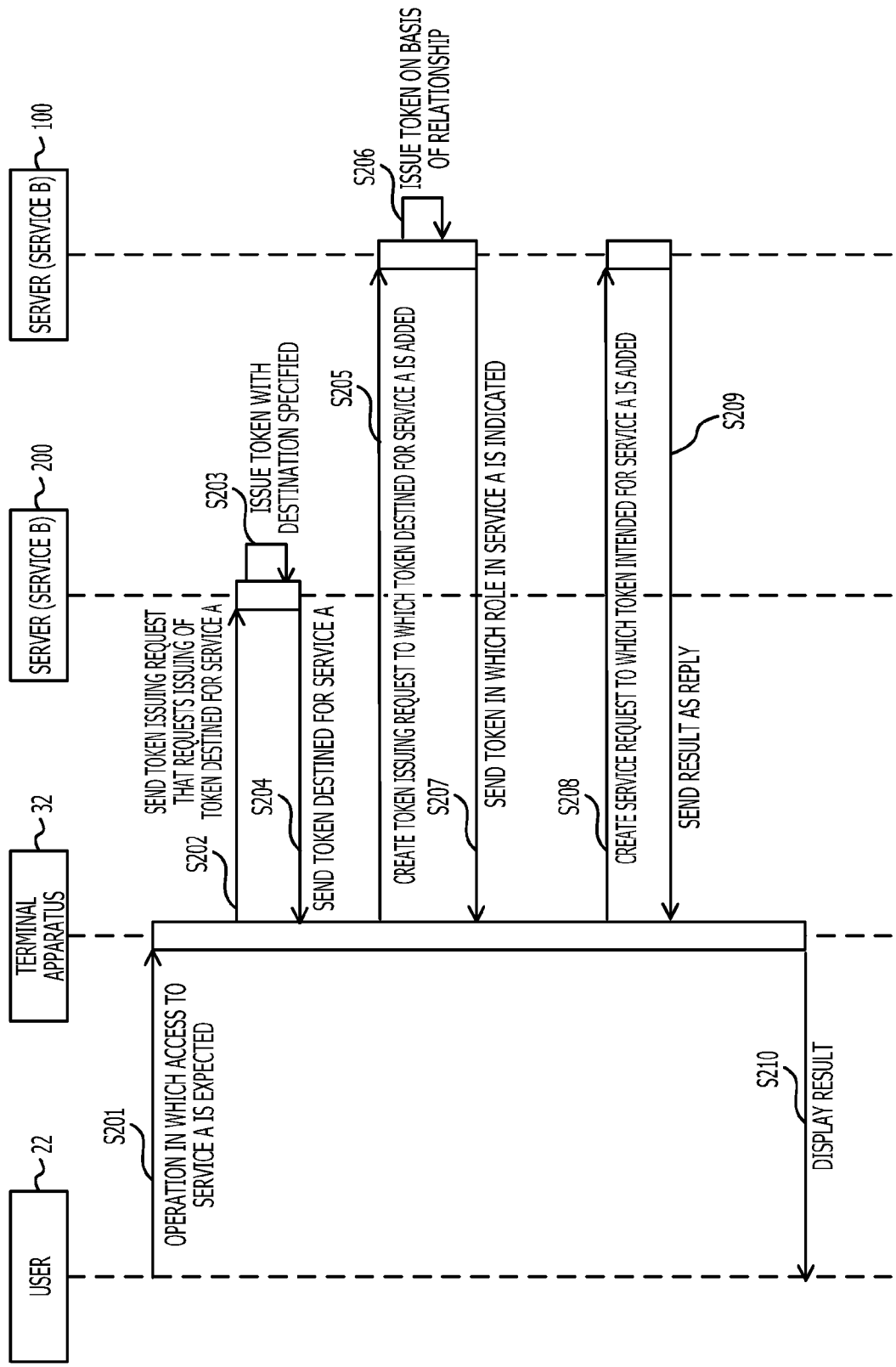
FIG. 21 is a sequence diagram illustrating an example of a procedure of service providing processing.

FIG. 21 is an example of a procedure of service providing processing. In the example in FIG. 21, the user 22 having an account for the server 200 uses a service provided by the server 100. Processing in FIG. 21 assumes that the user 22 has been already authenticated by the server 200 through the terminal apparatus 32 and the role assigned to the user 22 in service B has been determined.

S201: The user 22 operates the terminal apparatus 32 to command the application 32a to perform processing that expects an access to service A.

S202: The application 32a in the terminal apparatus 32 sends, to the server 200, a token issuing request that requests the issuing of a token destined for service A, in response to the operation by the user 22. That is, the token issuing request includes information in which the destination of the token to be issued is indicated.

S203: The access controller 240 in the server 200 receives the token issuing request and transfers the received token issuing request to the authentication unit 230. The authentication unit 230 proves the role assigned to the user 22 in service B and issues a token in which a destination, which is service A, is specified.

S204: The authentication unit 230 in the server 200 sends a token in which a role in service B is indicated and service A is specified as the destination, through the access controller 240 to the terminal apparatus 32.

S205: The application 32a in the terminal apparatus 32 creates a token issuing request, in service A, to which the token with service A specified as the destination is added. The application 32a sends the token issuing request in service A to the server 100.

S206: The access controller 140 in the server 100 receives the token issuing request and transfers the received token issuing request to the authentication unit 130. The authentication unit 130 verifies that the added token is valid and the destination of the added token is service A. After confirming that a valid token destined for service A is added, the authentication unit 130 issues a token that proves the role assigned to the user 22 in service A.

Subsequent processing in S207 to S210 is almost the same as in S117 to S120 in the second embodiment in FIG. 13, respectively.

When a token with a destination specified is used to authenticate a role in cooperation as described above, the token issued by the server 200 so as to be destined for service A can be used only by the server 100, which provides service A. This suppresses a token acquired from one server from being used in services that are not specified as destinations. That is, abuse of a token is suppressed.

It is also possible to use a token with a destination specified to assign a role in a chained manner.

Figure 22:
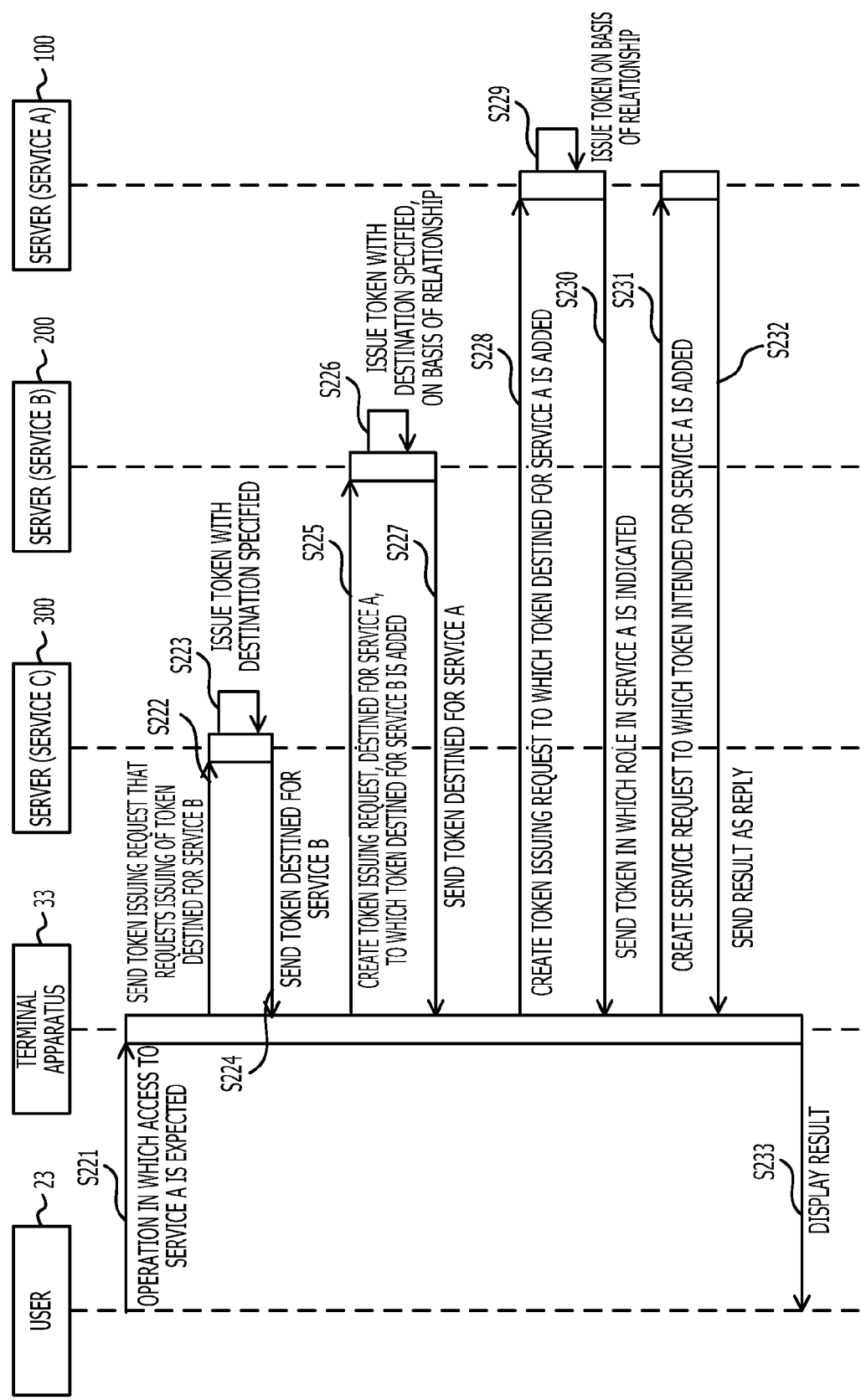
FIG. 22 is a sequence diagram illustrating an example of service providing processing in which a token with a destination specified is used to assign a role in a chained manner.

FIG. 22 is a sequence diagram illustrating an example of service providing processing in which a token with a destination specified is used to assign a role in a chained manner. In the example in FIG. 22, the user 23 having an account for the server 300 uses a service provided by the server 100. Processing in FIG. 22 assumes that the user 23 has been already authenticated by the server 300 through the terminal apparatus 33 and the role assigned to the user 23 in service C has been determined. It has been set in the application 33a in advance that a relationship is defined between service C and service B and between service B and service A, but no relationship is defined between service C and service A. The application 33a is assumed to have recognized that when a user having an account for the server 300 receives service A, a role is expected to be assigned to the user through service C, service B, and service A in that order in a chained manner.

S221: The user 23 operates the terminal apparatus 33 to command the application 33a to perform processing that expects an access to service A.

S222: The application 33a in the terminal apparatus 33 sends, to the server 300, a token issuing request that requests the issuing of a token destined for service B, in response to the operation by the user 23. That is, the token issuing request includes information in which the destination of the token to be issued is indicated.

S223: The access controller 340 in the server 300 receives the token issuing request and transfers the received token issuing request to the authentication unit 330. The authentication unit 330 proves the role assigned to the user 23 in service C and issues a token in which a destination, which is service B, is specified.

S224: The authentication unit 330 in the server 300 sends a token in which a role in service C is indicated and service B is specified as the destination, through the access controller 340 to the terminal apparatus 33.

S225: The application 33a in the terminal apparatus 33 creates a token issuing request, destined for service A, to which a token with service B specified as the destination is added. The application 33a sends the token issuing request destined for service A to the server 200.

S226: The access controller 240 in the server 200 receives the token issuing request and transfers the received token issuing request to the authentication unit 230. The authentication unit 130 verifies that the added token is valid and the destination of the added token is service B. After confirming that a valid token destined for service B has been added, the authentication unit 130 issues a token that proves the role assigned to the user 23 in service B and in which service A is specified as a destination.

Subsequent processing in S227 to S233 is almost the same as in S204 to S210 in FIG. 21, respectively.

As described above, to provide a service, a token with a role specified can also be used to assign a role in a chained manner.

Next, processing in which the server 200 issues a token with a destination specified will be described below in detail.

Figure 23:
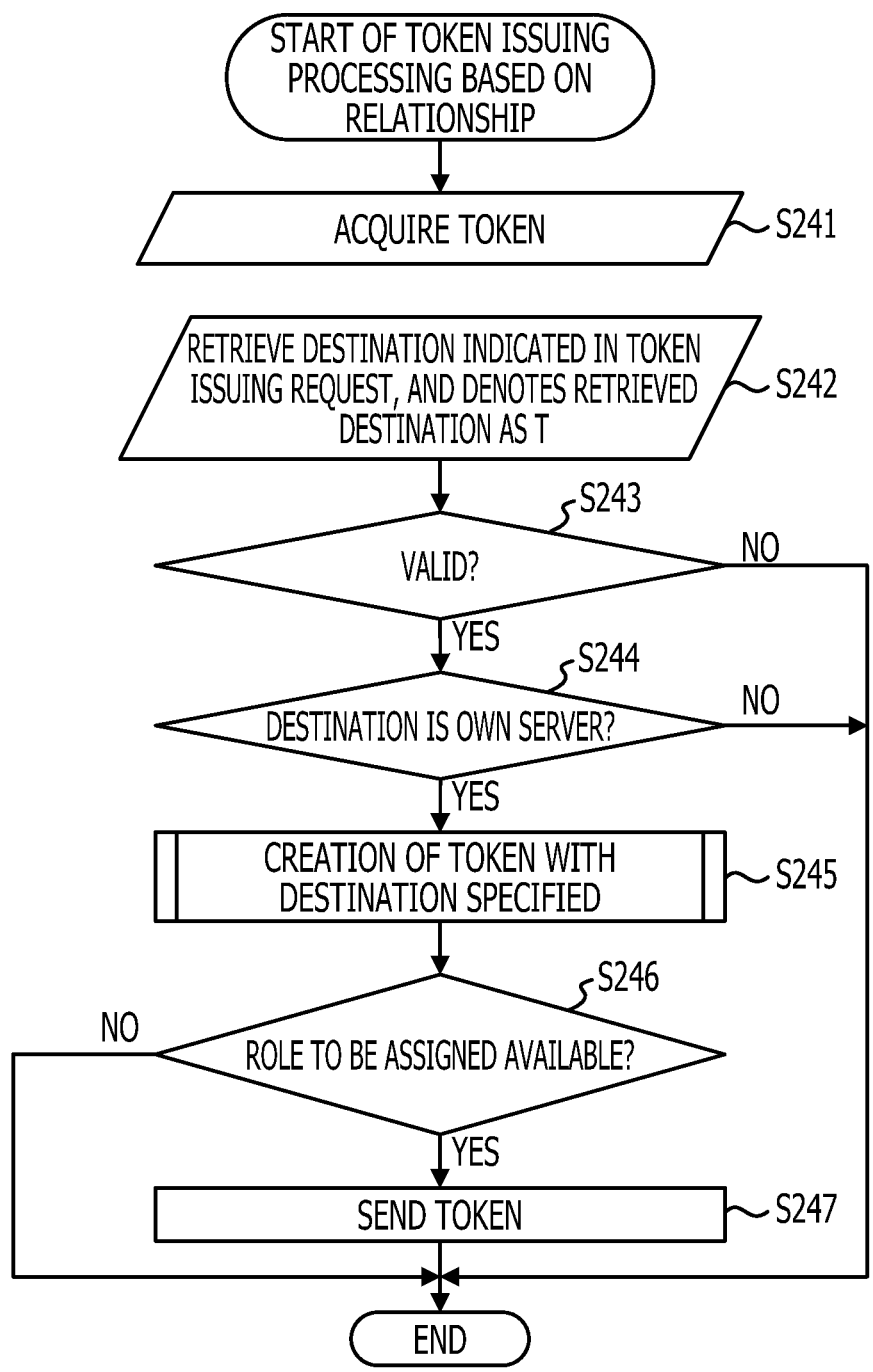
FIG. 23 is a flowchart illustrating an example of a procedure of token issuing processing based on a relationship in the fourth embodiment.

FIG. 23 is a flowchart illustrating an example of a procedure of token issuing processing based on a relationship in the fourth embodiment. Processing in S241, S243, S246, and S247 in FIG. 23 is the same as in S141, S142, S144, and S145 in the second embodiment in FIG. 15, respectively. Processing in S242, S244, and S245 differs from the second embodiment. The processing in S242, S244, and S245 will be described below.

S242: The authentication unit 230 retrieves the destination indicated in the token issuing request, and denotes the retrieved destination as T.

S244: The authentication unit 230 decides whether the destination of the token added to the token issuing request is the server 100 itself. If, for example, the destination is indicated as a URL, when the URL indicated as the destination is the URL of the server 100, the authentication unit 230 decides that the destination is the authentication unit 230. If the destination is the authentication unit 230, the authentication unit 230 causes the processing to proceed to S245, in which the authentication unit 230 creates a token and issues it. If the destination is not the authentication unit 230, the authentication unit 230 terminates the processing without issuing a token.

S245: The authentication unit 230 creates a token with a destination specified. This processing will be described below in detail.

Figure 24:
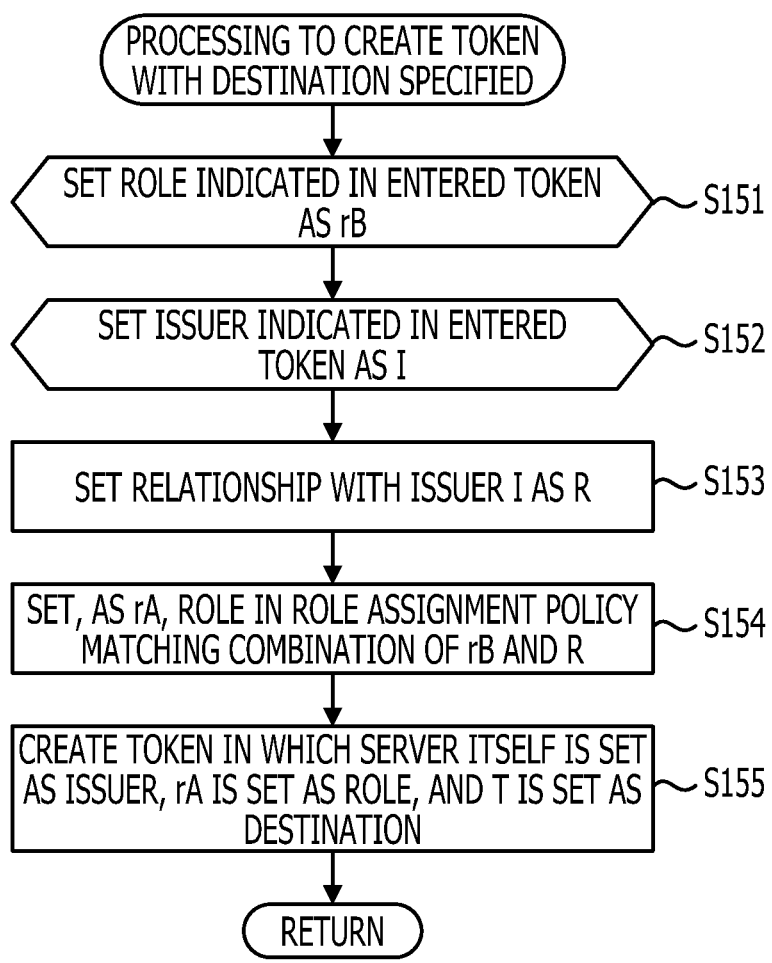
FIG. 24 is a flowchart illustrating an example of a procedure of processing to create a token with a destination specified.

FIG. 24 is a flowchart illustrating an example of a procedure of processing to create a token with a destination specified. Processing in S251 to S254 in FIG. 24 is the same as in S151 to S154 in the second embodiment in FIG. 16, respectively. Processing in S255 differs from the second embodiment. The processing in S255 will be described below.

S255: The authentication unit 230 creates a token in which the server itself is set as the issuer, rA is set as the role, and T is set as the destination of the token and to which an electronic signature is added. The access main body indicated in the entered token is set as the access main body in the token to be created.

As described above, a token issuing request that includes a destination and a token issued by another server is acquired.

In this case, only when the included destination of the token is the own server, a role in a service is assigned to the user who has sent the token issuing request. This suppresses a third party from disguising himself as a user who can use a service and thereby illegally using all services for which relationships to the service are defined.

Applications that operate in the terminal apparatus may be OS-native applications or may be applications that operate on a browser.

Although, in the above embodiments, capital relationships among companies have been used as examples of relationships among services, relationships among services are not limited to relationships among companies. If, for example, a doctor at a hospital is authenticated by a server at a city hospital and accesses a server at a health center in a local government, a relationship between the health center and the hospital is defined as a relationship between services. Then, for example, it is possible to make a difference between a range within which a doctor, assigned a role of a doctor, at a city hospital is allowed to access a database in a server at a health center and a range within which a doctor, assigned a role of a doctor, at a private hospital is allowed to access the database in the server at the health center.

The processing functions in the embodiments described above can be implemented by a computer. In this case, a program in which processing by the functions of the terminal apparatuses 31, 32 and 33 and the servers 100, 200 and 300 is coded is provided. When the program is executed in a computer, the above processing functions are implemented in the computer. The program in which the processing is coded can be recorded on a computer-readable storage medium in advance. Examples of the computer-readable storage medium include media in magnetic storage units, optical discs, magneto-optical recording media, and semiconductor memories. Examples of the magnetic storage units include hard disk drives (HDDs), flexible disks (FDs), and magnetic tape units. Examples of the optical discs include DVDs, DVD-RAMS, CD-ROMs, and CD-RWs. Examples of the magneto-optical recording media include magneto-optical disks (MOs). Temporary propagation signals themselves are not included in the recording medium on which the program is recorded.

To place the program on the market, a DVD, CD-ROM, or another type of transportable recording medium on which the program has been recorded is sold. It is also possible to store the program in a storage unit of a server computer and transfer the program from the server computer through a network to another computer.

The program recorded on the transportable recording medium or transferred from the server computer is supplied to a computer intended to execute the program. The computer stores the supplied program in its storage unit, for example. The computer reads the program from the storage unit and executes processing according to the program. The computer can also read the program directly from the transportable storage medium and can execute processing according to the program. The computer can also execute processing according to the program each time the computer receives the program from the server computer.

At least part of the above processing functions can also be implemented by a digital signal processor (DSP), an application-specific integrated circuit (ASIC), a programmable logic device (PLD), or another electronic circuit.

The structure of each unit indicated in the embodiments described above can be replaced with a structure that has a similar function. Another arbitrary structural member or another arbitrary process may be added. In addition, any two or more structures (features) in the embodiments described above may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A service providing method executed by a system including a first computer that provides a first service and a second computer that provides a second service, the service providing method comprising:

receiving, by the second computer, a user identifier used for identifying a user of a user apparatus and a password of the user, the user identifier and the password being transmitted from the user apparatus;

receiving, by the second computer, a request to provide a first role in the second service of the user transmitted from the user apparatus, after authentication of the user based on the received user identifier and the received password succeeds;

assigning, by the second computer, the first role to the user based on the received user identifier;

transmitting the assigned first role to the user apparatus;

transmitting, by the user apparatus, a processing request including the first role to the first computer which does not execute the authentication of the user; and assigning, by the first computer, a second role in the first service to the user based on the first role and a type of an organization that manages the second computer by referring to role assignment information that defines a role in the first service corresponding to a combination of a role in the second service and a type of an organization that manages the second computer; and providing the first service to the user apparatus based on the assigned second role, wherein the type of the organization includes a business contact and a subsidiary.

2. The service providing method according to claim 1, further comprising:

executing, by the first computer, processing of a first service within a range of a service allowed according to the assigned second role, with reference to a service definition in which a range of a service allowed according to a role and provided by the first computer is defined.

3. The service providing method according to claim 2, wherein the providing includes sending a processing result of the executed processing to the user apparatus as a reply.

4. The service providing method according to claim 1, wherein:

the receiving of the processing request includes receiving role information in which a service is specified as a destination;

the assigning of the second role includes assigning a role, assigned to a user who is using the user apparatus from which the received role information has been sent when the service for which the received role information is destined is a first service to be provided by the first computer.

5. The service providing method according to claim 1, wherein the assigning of the first role in the second service includes assigning the first role based on the received user identifier by referring to a role definition table in which a role, a user identifier and a password are associated with each other.

6. The service providing method according to claim 1, further comprising:
  authenticating the user by determining whether a combination of the user identifier and the password included in the authentication request matches authentication information, about the user, that has been stored in advance.

7. The service providing method according to claim 1, wherein a processing request includes a uniform resource locator (URL) related to the second service, and
  the service providing method further comprising
  specifying the type of the organization that manages the second computer based on the URL by referring to a relation definition table in which a URL and a type of an organization are associated with each other.

8. The service providing method according to claim 1, wherein a format of a processing request is security assertion markup language (SAML).

9. The service providing method according to claim 1, wherein the system further includes a third computer that provides a third service and that does not execute the authentication of the user, and
  the service providing method further comprising:
  transmitting, by the user apparatus, a processing request including the second role to a third computer that provides a third service and that does not execute the authentication of the user;
  assigning, by the third computer, a third role in a third service to the user based on the second role and a type of an organization that manages the first computer; and
  providing the third service to the user apparatus based on the assigned third role.

10. A non-transitory computer-readable recording medium storing a program that causes a first computer to execute an operation, the operation includes:
  receiving a processing request including a first role in a second service of a user of a user apparatus, the first role being assigned by a second computer based on a user identifier transmitted from the user apparatus and assigned when the second computer receives a request to provide the first role from the user apparatus after an authentication of the user using the user identifier and a password succeeds;
  assigning a second role in a first service to the user based on the first role and a type of an organization that manages the second computer by referring to role assignment information without executing the authentication of the user, the role assignment information defining a role in a first service corresponding to a combination of a role in the second service and a type of an organization that manages the second computer; and
  providing the first service to the user apparatus based on the second role,
  wherein the type of the organization includes a business contact and a subsidiary.

11. An information processing apparatus comprising:
  a memory; and
  a processor coupled to the memory and configured to:
  receive a processing request including a first role in a second service of a user of a user apparatus, the first role being assigned by a second computer based on a user identifier transmitted from the user apparatus and assigned when the second computer receives a request to provide the first role from the user apparatus after an authentication of the user using the user identifier and a password succeeds;
  assign a second role in a first service to the user based on the first role and a type of an organization that manages the second computer by referring to role assignment information without executing the authentication of the user, the role assignment information defining a role in a first service corresponding to a combination of a role in the second service and a type of an organization that manages the second computer; and
  provide the first service to the user apparatus based on the second role, wherein the type of the organization includes a business contact and a subsidiary.

* * * * *